US012795159B2

(12) United States Patent
Lee et al.

(10) Patent No.: US 12,795,159 B2
(45) Date of Patent: Nov. 10, 2026

(54) POINT CLOUD DATA TRANSMISSION METHOD, POINT CLOUD DATA TRANSMISSION DEVICE, POINT CLOUD DATA RECEPTION METHOD, AND POINT CLOUD DATA RECEPTION DEVICE

(71) Applicant: LG ELECTRONICS INC., Seoul (KR)

(72) Inventors: Sooyeon Lee, Seoul (KR); Hyejung Hur, Seoul (KR); Yousun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/698,940

(22) PCT Filed: Oct. 6, 2022

(86) PCT No.: PCT/KR2022/015035
§ 371 (c)(1),
(2) Date: Apr. 5, 2024

(87) PCT Pub. No.: WO2023/059089
PCT Pub. Date: Apr. 13, 2023

(65) Prior Publication Data

US 2024/0414372 A1 Dec. 12, 2024

(30) Foreign Application Priority Data

Oct. 6, 2021 (KR) ........................ 10-2021-0132230
Oct. 26, 2021 (KR) ........................ 10-2021-0143216

(51) Int. Cl.
*H04N 19/597* (2014.01)
*H04N 19/105* (2014.01)
*H04N 19/172* (2014.01)

(52) U.S. Cl.
CPC ......... *H04N 19/597* (2014.11); *H04N 19/105* (2014.11); *H04N 19/172* (2014.11)

(58) Field of Classification Search
CPC ............... H04N 19/597; H04N 19/105; H04N 19/172; H04N 19/593; H04N 19/70
See application file for complete search history.

(56) References Cited

U.S. PATENT DOCUMENTS

2020/0304823 A1 9/2020 Yea et al.
2021/0099711 A1 4/2021 Tourapis et al.
(Continued)

FOREIGN PATENT DOCUMENTS

KR 10-2295825 B1 8/2021
WO 2021/049758 A1 3/2021

OTHER PUBLICATIONS

International Search Report and Written Opinion in International Appln. No. PCT/KR2022/015035, mailed on Jan. 26, 2023, 15 pages (with English translation).
(Continued)

*Primary Examiner* — Francis Geroleo
(74) *Attorney, Agent, or Firm* — Fish & Richardson P.C.

(57) ABSTRACT

A point cloud data transmission method may include: encoding point cloud data; and transmitting a bitstream including the point cloud data. In addition, a point cloud data transmission device may include: an encoder for encoding point cloud data; and a transmitter for transmitting a bitstream including the point cloud data.

16 Claims, 42 Drawing Sheets

(56) References Cited

U.S. PATENT DOCUMENTS

| | | | | |
|---|---|---|---|---|
| 2021/0104075 | A1 | 4/2021 | Mammou et al. | |
| 2021/0264197 | A1 | 8/2021 | Lu et al. | |
| 2023/0105931 | A1* | 4/2023 | Van der Auwera .. | H04N 19/503 382/232 |
| 2024/0129530 | A1* | 4/2024 | Nishi .................... | G06T 9/001 |
| 2024/0135598 | A1* | 4/2024 | Nishi .................... | G06T 9/40 |
| 2024/0242393 | A1* | 7/2024 | Xu .................... | H04N 19/597 |

OTHER PUBLICATIONS

WG 7, MPEG 3D Graphics Coding, "G-PCC codec description," International Organization for standardization organisation internationale de normalisation, ISO/IEC JTC 1/SC 29/WG 7 MPEG 3D graphics coding, ISO/IEC JTC 1/SC 29/WG N0151, Jul. 2021, virtual, 152 pages.

Extended European Search Report in European Appln. No. 22878910.3, mailed on Nov. 13, 2024, 11 pages.

Ramasubramonian et al., "[G-PCC] EE13.2 report on inter prediction, Test 2," ISO/IEC JTC 1/SC 29/WG 7 M56839-v1, International Organisation for Standardisation Organisation Internationale De Normalisation, ISO/IEC JTC 1/SC 29/WG 7 Coding of Moving Pictures and Audio, Apr. 2021, Online, 4 pages.

Ramasubramonian et al., "[G-PCC][New proposal] Inter prediction with predictive geometry coding," ISO/IEC JTC 1/SC 29/WG 7 M56117, International Organisation for Standardisation Organisation Internationale De Normalisation, ISO/IEC JTC 1/SC 29/WG 7 Coding of Moving Pictures and Audio, Jan. 2021, Online, 3 pages.

Taget et al., "[G-PCC][New ]EE13.51 related: Improved List of Predictors," ISO/IEC JTC 1/SC 29/WG 7 M56744, International Organisation for Standardisation Organisation Internationale De Normalisation, ISO/IEC JTC 1/SC 29/WG 7 Coding of Moving Pictures and Audio, Apr. 2021, Online, 5 pages.

Xu et al., "[G-PCC][EE13.2 related] [New proposal] Bi-direction Inter Prediction for GPCC," ISO/IEC JTC1/SC29/WG7 M58013, International Organisation for Standardisation Organisation Internationale De Normalisation, ISO/IEC JTC1/SC29/WG7 Coding of Moving Pictures and Audio, Oct. 2021, Online, 5 pages.

Office Action in Indian Appln. No. 202417034339, mailed on Apr. 20, 2026, 8 pages.

* cited by examiner

FIG. 33

| seq_parameter_set_rbsp( ) { | Descriptor |
|---|---|
| ... | |
| sps_interEnable | u(1) |
| if(interEnable) { | |
| numGroupOfFrame | ue(v) |
| multiFrameEnableFlag | u(1) |
| if(multiFrameEnableFlag) | ue(v) |
| CodingOrder[numGroupOfFrame] | ue(v) |
| } | |
| } | |
| ... | |
| } | |

FIG. 34

| geometry_parameter_set( ) { | Descriptor |
|---|---|
| ... | |
| gps_interEnable | u(1) |
| if(gps_interEnable){ | |
| gps_multiFrameEnableFlag | u(1) |
| gps_nextDisplayIndex | ue(v) |
| gps_numRefFrame | ue(v) |
| gps_refIndex[numRefFrame] | ue(v) |
| } | |
| ... | |
| } | |

FIG. 35

| attribute_parameter_set( ) { | Descriptor |
|---|---|
| ... | |
| aps_interEnable | u(1) |
| if(aps_interEnable){ | |
| aps_multiFrameEnableFlag | u(1) |
| aps_nextDisplayIndex | ue(v) |
| aps_numRefFrame | ue(v) |
| aps_refIndex[numRefFrame] | ue(v) |
| } | |
| ... | |
| } | |

FIG. 36

| Struct GinterPredicter { | Descriptor |
|---|---|
| enum PredictionMode | ue(v) |
| { | |
| none | |
| singlePoint | |
| multiPoint | |
| MultiPointAverage | |
| } | |
| GinterPredict(curPoint, points, Predictionmode, refIndex[numRefFrame]) | |
| | |
| } | |
| ... | |
| } | |

FIG. 37

| GinterPredicter::GinterPredict (Vec3* curPoint, Vec3* points, GinterPredicter:: PredictionMode Pmode, bool angular, refIndex[numRefFrame]) { | Descriptor |
| --- | --- |
| Vec3 pred; | u(1) |
| Switch (Pmode) | |
| case GinterPredictor::none: { | |
| for (int i =0; i< 4; i++) { | |
| Gpredicter::Mode = Gpredicter::Mode(i) | |
| Gpredicter predicter = makePredicter(nodeIdx, mode, _pgeom_min_radius, [=] (int idx){ return nodes[idx].parent } | |
| } | |
| | |
| case GinterPredicter::singlePoint : { | |
| for (int i=0; i<4;i++) | |
| GinterPredicter predicter = singlePredicter(curPoint, points, refIndex[numRefFrame]) | |
| } | |
| | |
| case GinterPredicter::MultiPoint : { | |
| for (int i=0; i<4;i++) | |
| GinterPredicter predicter = MultiPredicter(curPoint, points, refIndex[numRefFrame]) | |
| } | |
| | |
| case GinterPredicter::MultiPointAverage : { | |
| for (int i=0; i<4;i++) | |
| GinterPredicter predicter = MultiAveragePredicter(curPoint, points, refIndex[numRefFrame]) | |
| } | |
| | |
| } | |
| ... | |
| } | |

FIG. 38

| GinterPredicter singlePredicter(curPoint, points, refIndex[numRefFrame] { | Descriptor |
|---|---|
| | u(1) |
| for(int i=0; i<4;i++) | |
| { | |
| switch(pMode) | |
| case 1: | |
| interPred = points[0] | |
| case 2: | |
| interPred = points[1] | |
| case 3: | |
| interPred = points[2] | |
| case 4: | |
| interPred = points[3] | |
| | |
| residual = curPoint - interPred | |
| if (residual < minResidual) { | |
| minResidual = residual | |
| predMode = pMode | |
| pred = interPred | |
| } | |
| } | |
| return [predMode, pred, minResidual] | |
| } | |
| ... | |
| } | |

FIG. 39

| GinterPredicter MultiPredicter(curPoint, points, refIndex[numRefFrame] { | Descriptor |
| --- | --- |
| | u(1) |
| for(int i=0; i<4;i++) | |
| { | |
| switch(pMode) | |
| case 1: | |
| interPred = mean(points[0], point[2]) | |
| case 2: | |
| interPred = mean(points[0], point[3]) | |
| case 3: | |
| interPred = mean(points[1], points[2]) | |
| case 4: | |
| interPred = mean(points[1], points[3]) | |
| | |
| residual = curPoint - interPred | |
| if (residual < minResidual) { | |
| minResidual = residual | |
| predMode = pMode | |
| pred = interPred | |
| } | |
| } | |
| return [predMode, pred, minResidual] | |
| } | |
| ... | |
| } | |

FIG. 40

| GinterPredicter MultiAveragePredicter(curPoint, points, refIndex[numRefFrame] { | Descriptor |
|---|---|
| | u(1) |
| for(int i=0; i<4;i++) | |
| { | |
| switch(pMode) | |
| case 1: | |
| interPred = mean(points[0], point[2]) | |
| case 2: | |
| interPred = mean(PointsExceptFarthest(points)) | |
| case 3: | |
| interPred = geomean(points[0], points[1], points[2], points[3]) | |
| case 4: | |
| interPred = geomean(PointsExceptFarthest(points)) | |
| | |
| residual = curPoint - interPred | |
| if (residual < minResidual) { | |
| minResidual = residual | |
| predMode = pMode | |
| pred = interPred | |
| } | |
| } | |
| return [predMode, pred, minResidual] | |
| } | |
| ... | |
| } | |

FIG. 41

| seq_parameter_set_rbsp( ) { | Descriptor |
|---|---|
| ... | |
| sps_interEnable | u(1) |
| if(interEnable) { | |
| numGroupOfFrame | ue(v) |
| cumulFrameEnableFlag | u(1) |
| } | |
| } | |
| ... | |
| } | |

FIG. 42

| geometry_parameter_set( ) { | Descriptor |
|---|---|
| ... | |
| gps_interEnable | u(1) |
| if(gps_interEnable){ | |
| gps_cumulFrameEnableFlag | u(1) |
| if(gps_cumulFrameEnableFlag){ | |
| numRefFrame | ue(v) |
| RefIndex[numRefFrame] | se(v) |
| predictionDirection | ue(v) |
| } | |
| ... | |

| attribute_parameter_set( ) { | Descriptor |
|---|---|
| ... | |
| aps_interEnable | u(1) |
| if(aps_interEnable){ | |
| aps_cumulFrameEnableFlag | u(1) |
| if(aps_cumulFrameEnableFlag){ | |
| numRefFrame | ue(v) |
| RefIndex[numRefFrame] | se(v) |
| predictionDirection | ue(v) |
| } | |
| ... | |
| } | |

POINT CLOUD DATA TRANSMISSION METHOD, POINT CLOUD DATA TRANSMISSION DEVICE, POINT CLOUD DATA RECEPTION METHOD, AND POINT CLOUD DATA RECEPTION DEVICE

CROSS-REFERENCE TO RELATED APPLICATIONS

This application is a National Stage application under 35 USC § 371 of International Application No. PCT/KR2022/015035, filed on Oct. 6, 2022, which claims the benefit of Korean Patent Application No. 10-2021-0143216, filed on Oct. 26, 2021, and Korean Patent Application No. 10-2021-0132230, filed on Oct. 6, 2021. The disclosures of the prior applications are incorporated by reference in their entirety.

TECHNICAL FIELD

Embodiments relate to a method and apparatus for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide an apparatus and method for efficiently processing point cloud data. Embodiments provide a point cloud data processing method and apparatus for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding point cloud data, and transmitting a bitstream containing the point cloud data. In another aspect of the present disclosure, a method of receiving point cloud data may include receiving a bitstream including point cloud data, and decoding the point cloud data.

Apparatuses and methods according to embodiments may process point cloud data with high efficiency.

The apparatuses and methods according to the embodiments may provide a high-quality point cloud service.

The apparatuses and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts.

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 33 shows an exemplary syntax of a sequence parameter set (seq_parameter_set) according to embodiments;

FIG. 34 shows an exemplary syntax of a geometry parameter set (geometry_parameter_set) according to embodiments;

FIG. 35 shows an exemplary syntax of an attribute parameter set (attribute_parameter_set) according to embodiments;

FIGS. 36 to 38 illustrate a process of a method of predicting a current point according to embodiments;

FIG. 39 illustrates a method of predicting a current point according to embodiments;

FIG. 40 illustrates a method of predicting a current point according to embodiments;

FIG. 41 shows an exemplary syntax of a sequence parameter set (seq_parameter_set);

FIG. 42 shows an exemplary syntax of a geometry parameter set (geometry_parameter_set) according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
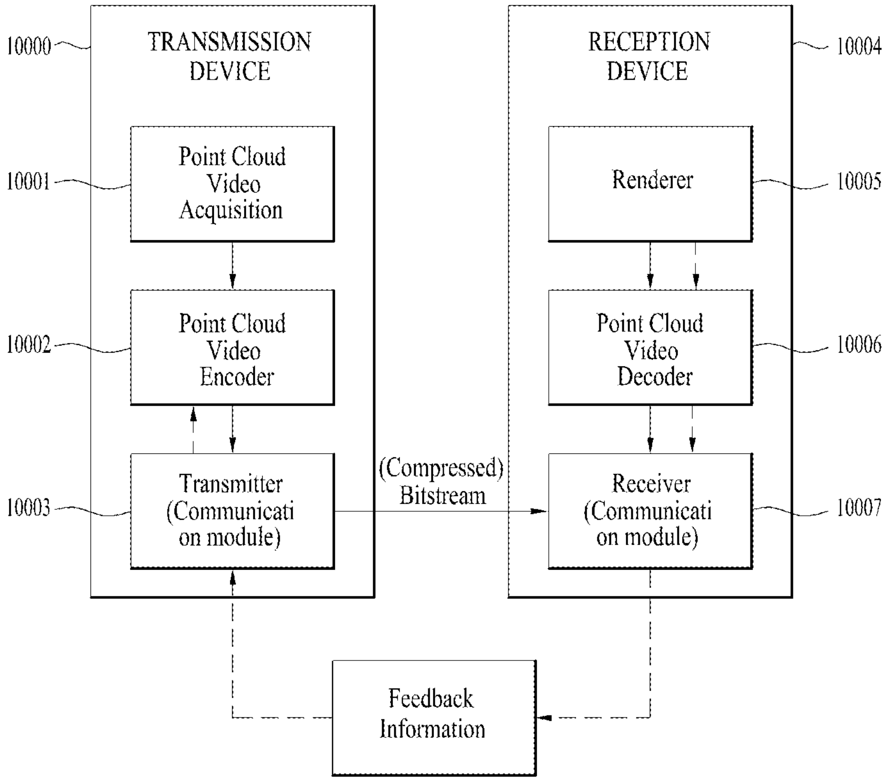
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process to the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
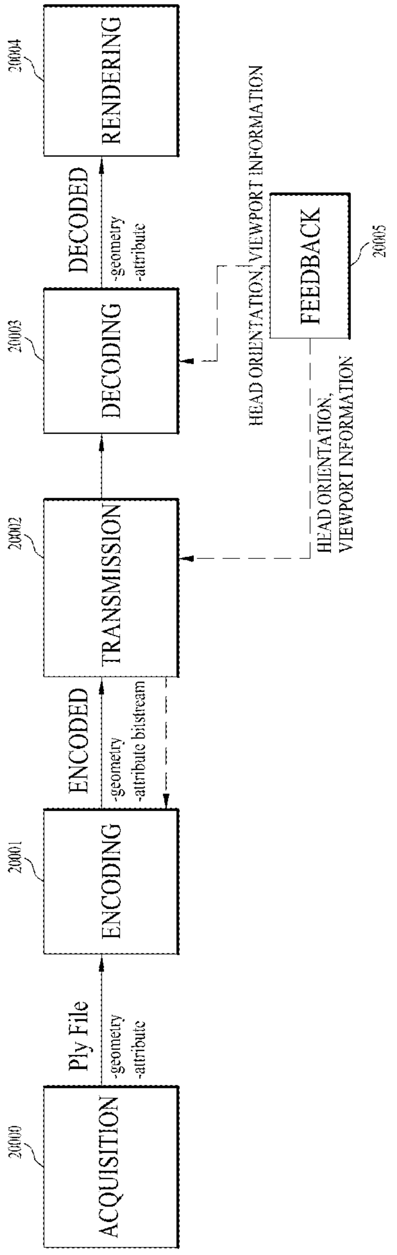
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (e.g., the point cloud transmission device 10000 or the point cloud video acquirer 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
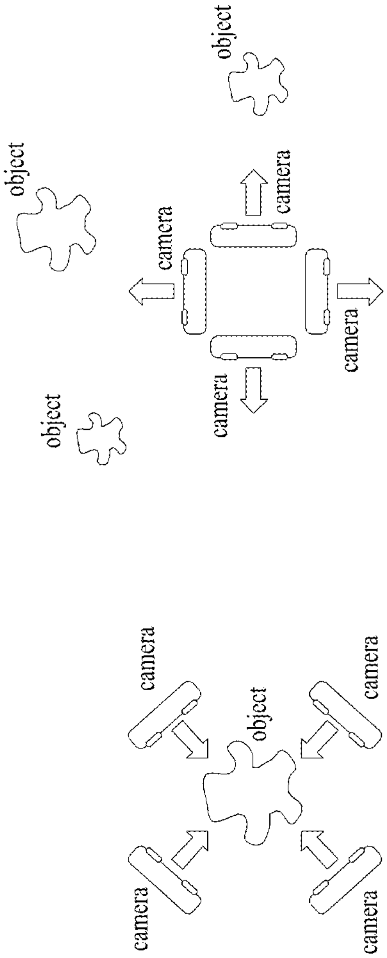
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
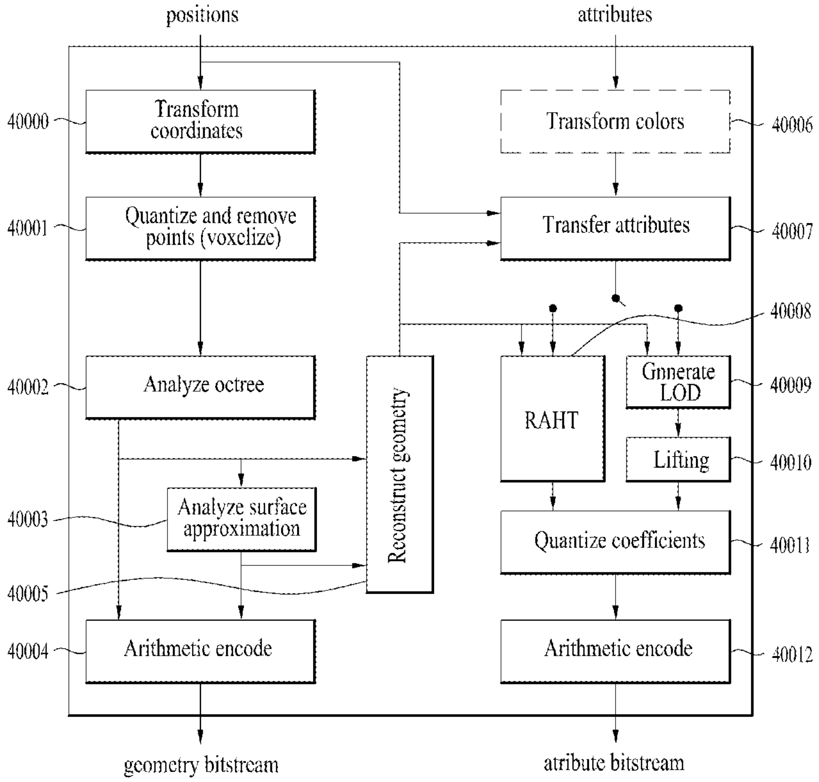
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) may be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing apparatus, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
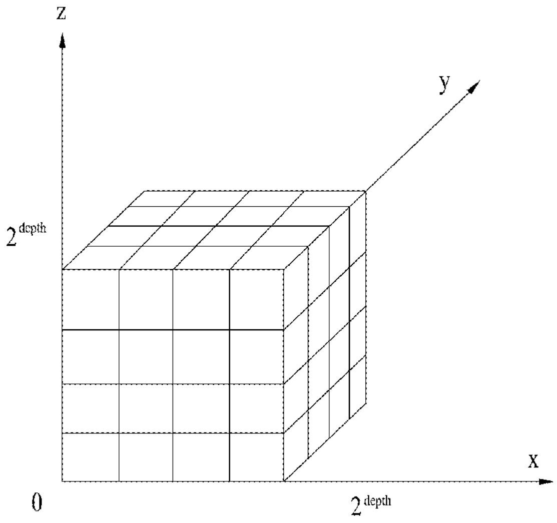
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
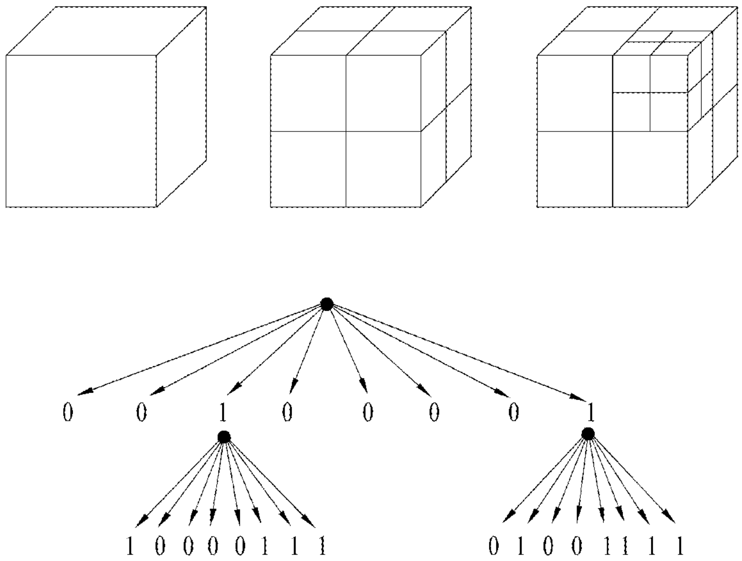
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (e.g., the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and (2d, 2d, 2d). Here, 2d may be set to a value constituting the smallest bounding box surrounding all points of the point cloud content (or point cloud video). Here, d denotes the depth of the octree. The value of d is determined in the following equation. In the following equation, (xintn, yintn, zintn) denotes the positions (or position values) of quantized points.

$$d=\text{Ceil}\left(\text{Log2}\left(\text{Max}\left(x_n^{int},\, y_n^{int},\, z_n^{int},\, n=1,\, \ldots\, ,N\right)+1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (e.g., the arithmetic encoder 40004) according to the embodiments may perform entropy encoding on the occupancy codes. In order to increase the compression efficiency, the point cloud encoder may perform intra/inter-coding on the occupancy codes. The reception device (e.g., the reception device 10004 or the point cloud video decoder 10006) according to the embodiments reconstructs the octree based on the occupancy codes.

The point cloud encoder (e.g., the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004)

according to the embodiments may perform entropy coding on the positions (or position values) of the points.

The point cloud encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix}\mu_x\\\mu_y\\\mu_z\end{bmatrix}=\frac{1}{n}\sum_{i=1}^{n}\begin{bmatrix}x_i\\y_i\\z_i\end{bmatrix}; \quad \text{i)}$$

$$\begin{bmatrix}\bar{x}_i\\\bar{y}_i\\\bar{z}_i\end{bmatrix}=\begin{bmatrix}x_i\\y_i\\z_i\end{bmatrix}-\begin{bmatrix}\mu_x\\\mu_y\\\mu_z\end{bmatrix}; \quad \text{ii)}$$

$$\begin{bmatrix}\sigma_x^2\\\sigma_y^2\\\sigma_z^2\end{bmatrix}=\sum_{i=1}^{n}\begin{bmatrix}\bar{x}_i^2\\\bar{y}_i^2\\\bar{z}_i^2\end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

Triangles formed from vertices ordered 1, . . . , n

| n | triangles |
|---|---|
| 3 | (1,2,3) |
| 4 | (1,2,3), (3,4,1) |
| 5 | (1,2,3), (3,4,5), (5,1,3) |
| 6 | (1,2,3), (3,4,5), (5,6,1), (1,3,5) |
| 7 | (1,2,3), (3,4,5), (5,6,7), (7,1,3), (3,5,7) |
| 8 | (1,2,3), (3,4,5), (5,6,7), (7,8,1), (1,3,5), (5,7,1) |
| 9 | (1,2,3), (3,4,5), (5,6,7), (7,8,9), (9,1,3), (3,5,7), (7,9,3) |
| 10 | (1,2,3), (3,4,5), (5,6,7), (7,8,9), (9,10,1), (1,3,5), (5,7,9), (9,1,5) |
| 11 | (1,2,3), (3,4,5), (5,6,7), (7,8,9), (9,10,11), (11,1,3), (3,5,7), (7,9,11), (11,3,7) |
| 12 | (1,2,3), (3,4,5), (5,6,7), (7,8,9), (9,10,11), (11,12,1), (1,3,5), (5,7,9), (9,11,1), (1,5,9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

Figure 7:
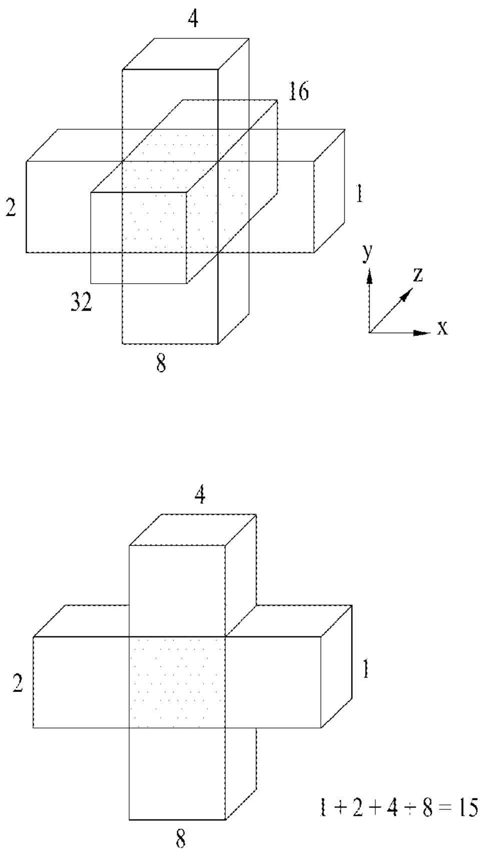
FIG. 7 shows an example of a neighbor node pattern according to embodiments.

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (e.g., the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
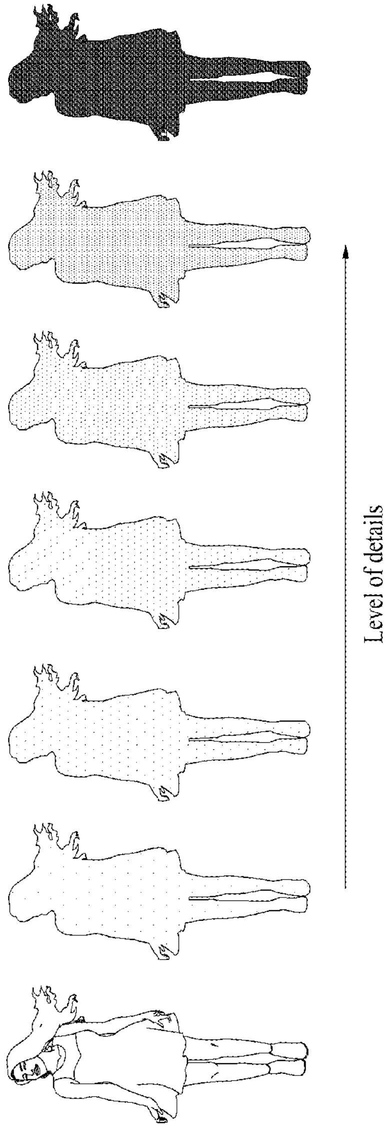
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (e.g., the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
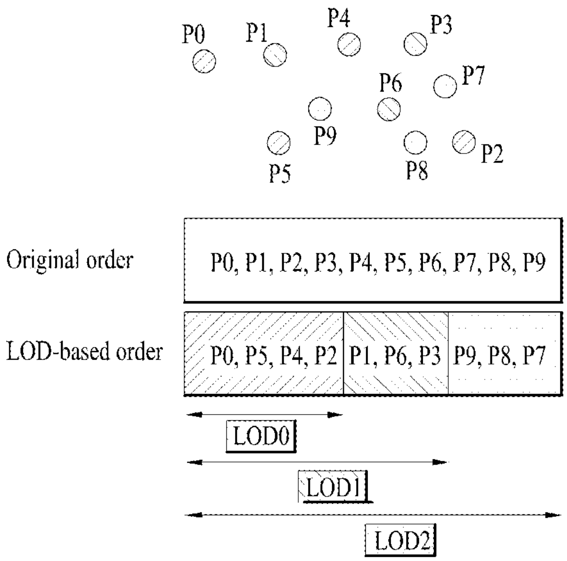
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (e.g., the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (e.g., the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE 1

| Attribute prediction residuals quantization pseudo code |
|---|
| int PCCQuantization(int value, int quantStep) {<br>if( value >=0) {<br>return floor(value / quantStep + 1.0 / 3.0);<br>} else {<br>return −floor(−value / quantStep + 1.0 / 3.0);<br>}<br>} |

TABLE 2

| Attribute prediction residuals inverse quantization pseudo code |
|---|
| int PCCInverseQuantization(int value, int quantStep) {<br>if( quantStep ==0) {<br>return value;<br>} else {<br>return value * quantStep;<br>}<br>} |

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (e.g., the arithmetic encoder 40012) may perform entropy coding on the attributes of the corresponding point without performing the above-described operation.

The point cloud encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.
2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.
5) Lift update process: Divide the attribute values of the update array for all predictors by the weight value of the updateweight array of the predictor index, and add the existing attribute value to the values obtained by the division.
6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level 1. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
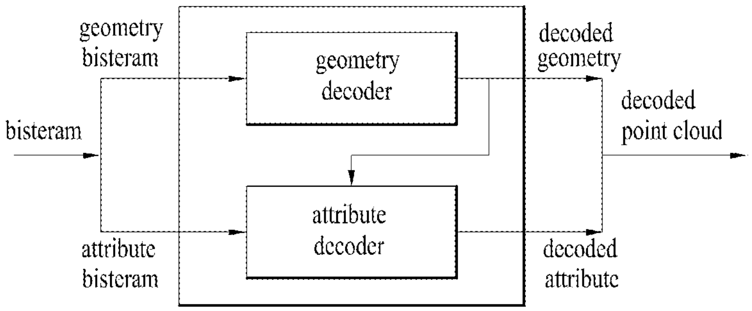
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
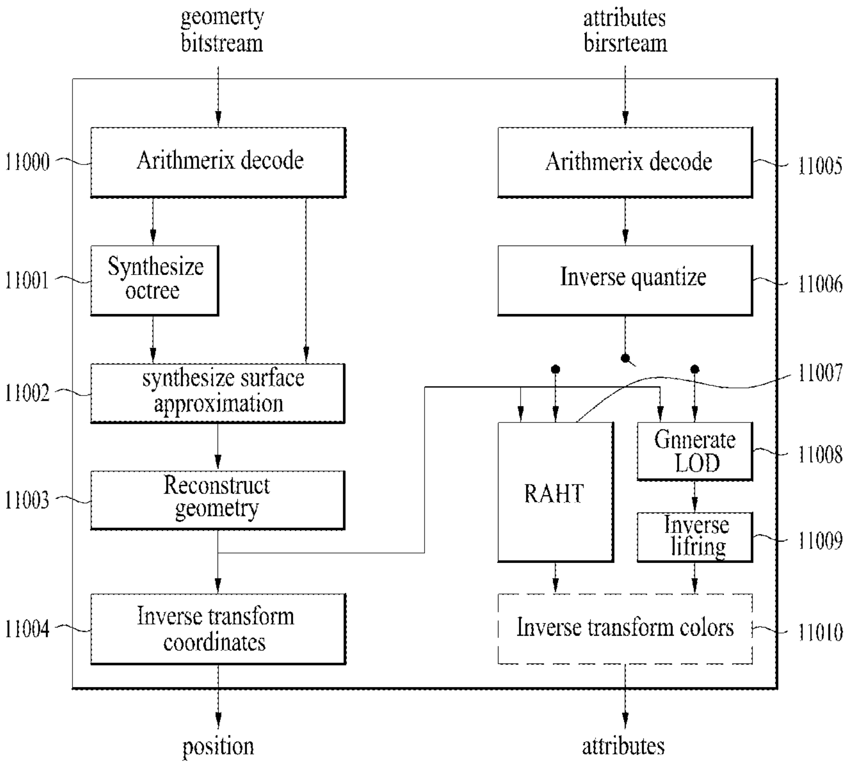
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process to the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as a reverse process to the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
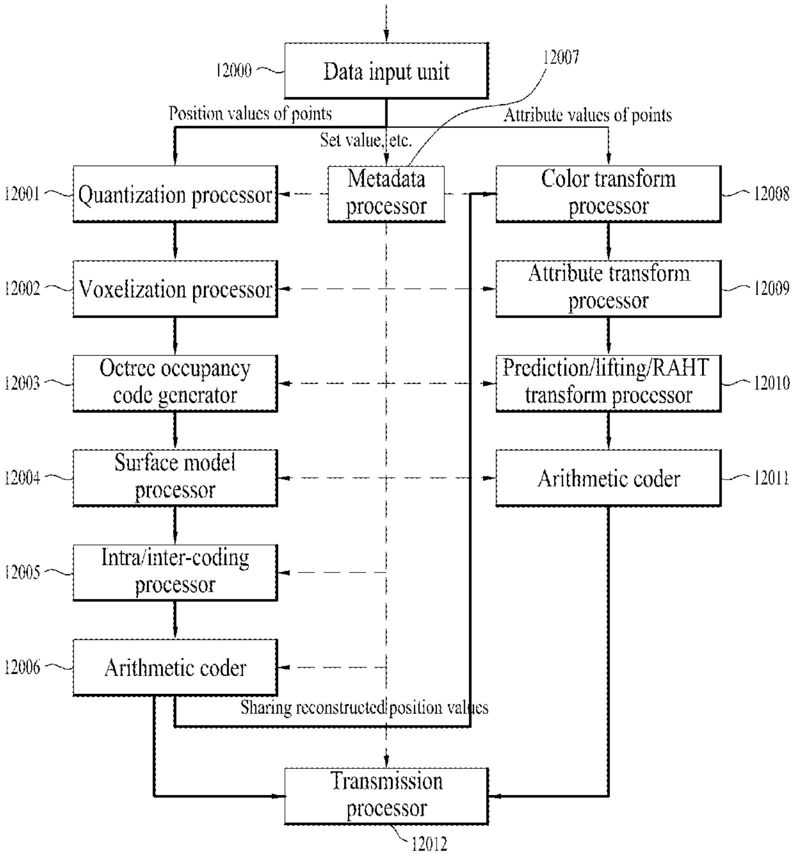
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geomparameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
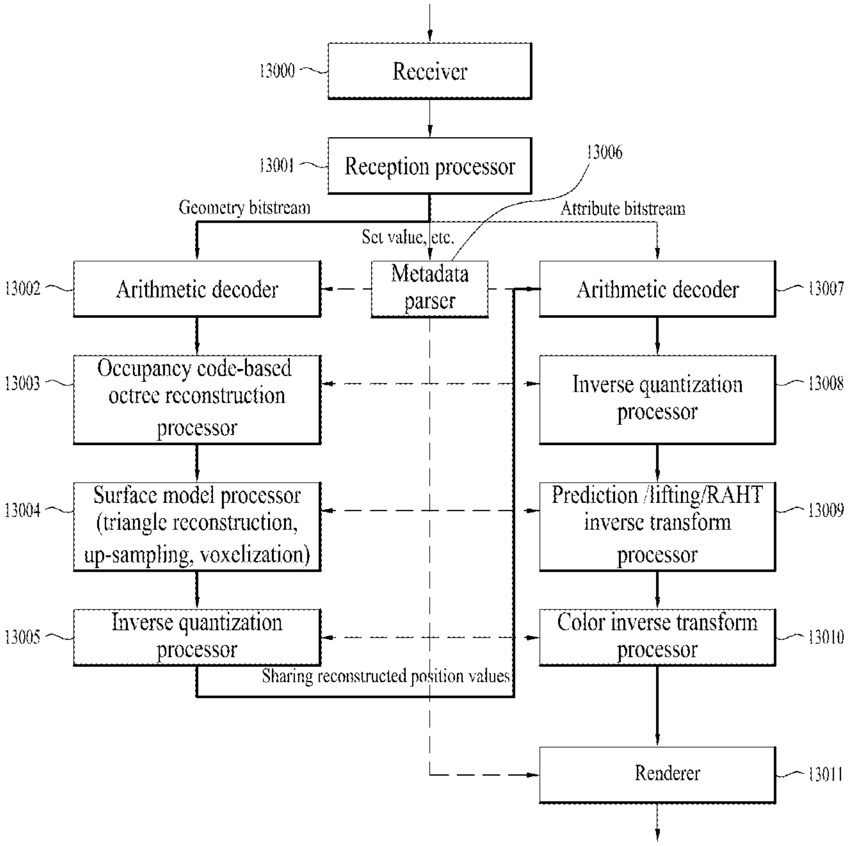
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process to the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. A detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
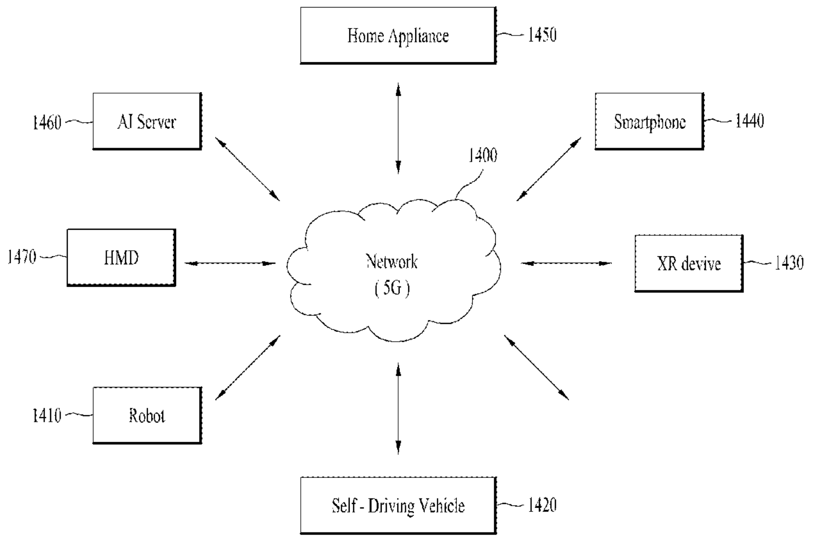
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission/reception device according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, point cloud data is composed of a set of points, each of which may have geometry data (geometry information) and attribute data (attribute information). The geometry data is the three-dimensional position of each point (e.g., the coordinate values of the x, y, and z axes). That is, the position of each point is indicated by parameters in a coordinate system representing a three-dimensional space (e.g., the parameters (x, y, z) of the three axes representing the space, the x, y, and z axes). The attribute information may include color (RGB, YUV, etc.), reflectance, normals, and transparency. The attribute information may be represented in the form of a scalar or vector.

According to embodiments, point cloud data may be classified into category 1 for static point cloud data, category 2 for dynamic point cloud data, and category 3 for point cloud data acquired through dynamic movement, depending on the type and acquisition method of the point cloud data. Category 1 is composed of a point cloud of a single frame with a high density of points for an object or space. Category 3 data may be divided into as frame-based data with multiple frames acquired while moving, and fused data, which is a single frame matching a point cloud acquired for a large space by a LiDAR sensor with a color image acquired as a 2D image.

According to embodiments, inter-prediction (coding/decoding) may be used to efficiently compress three-dimensional point cloud data with multiple frames over time, such as frame-based point cloud data with multiple frames. Inter-prediction coding/decoding may be applied to geometry information and/or attribute information. Inter-prediction may be referred to as inter-image prediction or inter-frame prediction, and intra-prediction may be referred to as intra-frame prediction.

According to embodiments, the point cloud data transmission/reception device/method is capable of multidirectional prediction between multiple frames. The point cloud data transmission/reception device/method may distinguish between the coding order and the display order of the frames, and may predict the point cloud data according to a predetermined coding order. The point cloud data transmission/reception device/method according to embodiments may perform inter-prediction in a prediction tree structure based on references between multiple frames.

Further, according to embodiments, the point cloud data transmission/reception device/method may perform inter-prediction by generating a cumulative reference frame. The cumulative reference frame may be an accumulation of a plurality of reference frames.

The point cloud data transmission/reception device/method according to embodiments may define a prediction unit in order to apply a technique of prediction between multiple frames as a method for increasing the compression efficiency of point cloud data having one or more frames. The prediction unit according to the embodiments may be referred to by various terms, such as a unit, a first unit, a region, a first region, a box, a zone, or a unit.

The point cloud data transmission/reception device/method according to the embodiments may compress/reconstruct data composed of a point cloud. Specifically, for effective compression of a point cloud having one or more frames, motion estimation and data prediction may be performed considering the characteristics of the point cloud captured by the LiDAR sensor and the distribution of data contained in the prediction unit.

Figure 15:
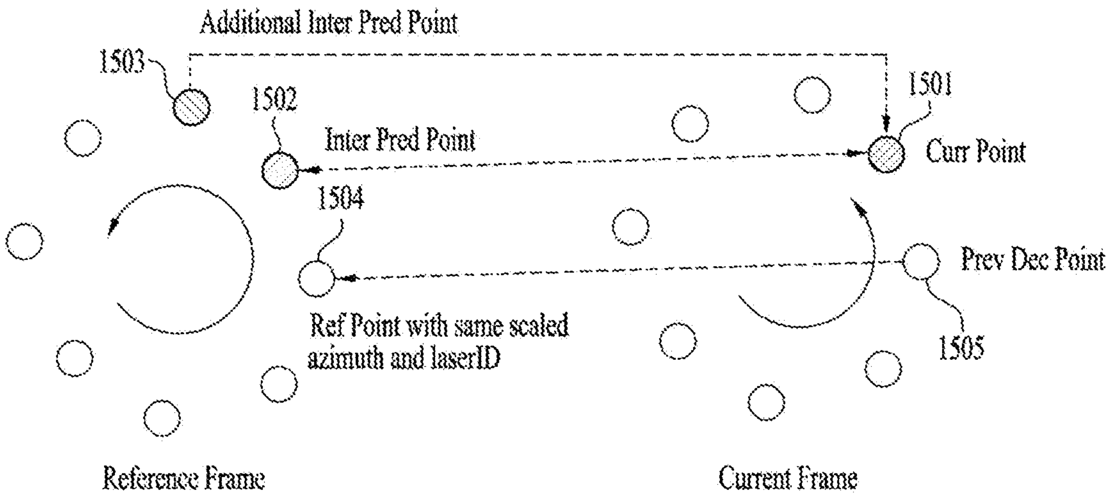
FIG. 15 illustrates inter-prediction according to embodiments.

FIG. 15 illustrates inter-frame prediction according to embodiments.

Referring to FIG. 15, the point cloud data includes a plurality of frames. The plurality of frames may be referred to as a GOF. A frame that is encoded or decoded by the transmission/reception device/method according to embodiments may be referred to as a current frame, and a frame referenced to encode or decode the current frame may be referred to as a reference frame.

The transmission/reception device/method according to the embodiments may perform inter-frame prediction (inter prediction) when generating a predictive tree structure for predicting point cloud data. In the predictive tree structure, the frame coded immediately before the current frame is determined as the reference frame, and the reference frame is searched for a point 1504 whose azimuth is most similar to the point 1505 decoded prior to the current point in the current frame and whose laser ID is the same. Then, the closest point 1502 or the second closest point 1503 to the point 1504 among the points having an increasing azimuth may be determined as a predicted value, that is, a predictor of the current point 1501. In this case, the case of determining the closest point as the predictor and the case of determining the second closest point as the predictor may be separately signaled by a flag, such that point information to be considered as the position of the current point in inter-prediction may be determined, and then the information about the corresponding predictor may be delivered to the receiver.

The predicted value or predictor according to the embodiments may be referred to as a candidate point for predicting the current point.

Figures 43, 44:
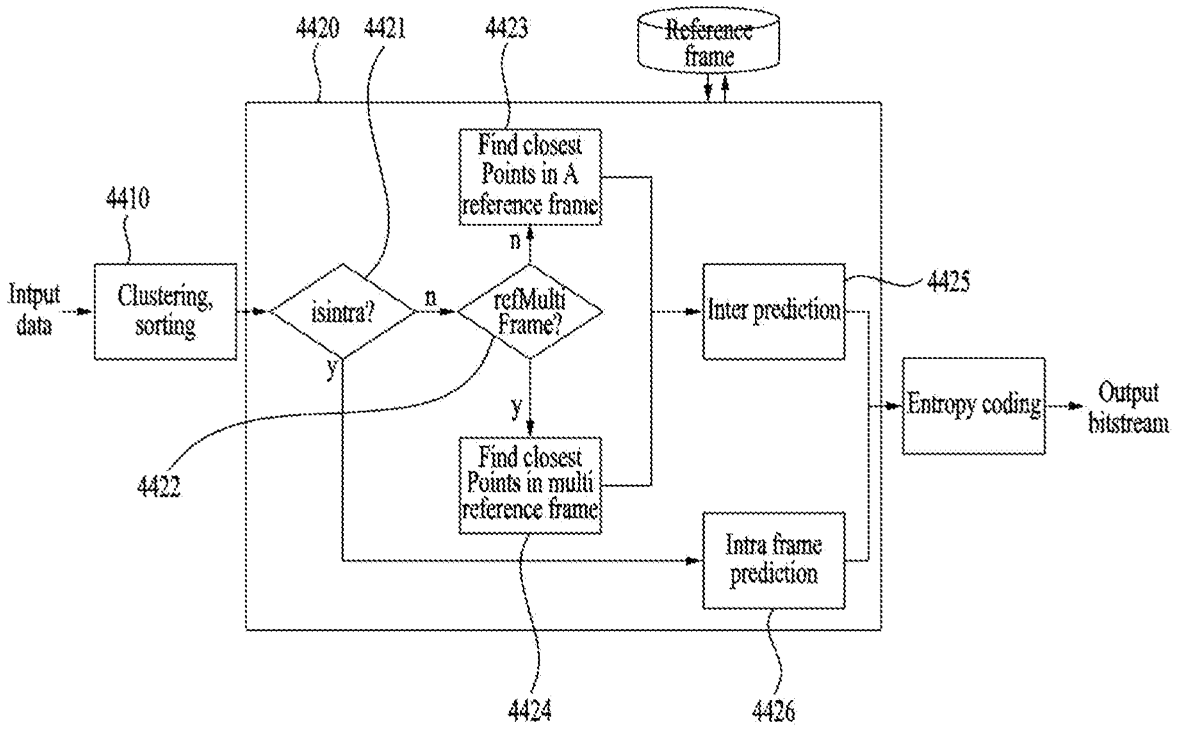
FIG. 43 shows an exemplary of an attribute parameter set (attribute_parameter_set) according to embodiments.
FIG. 44 is a flowchart illustrating a device/method for transmitting point cloud data according to embodiments.
Figure 45:
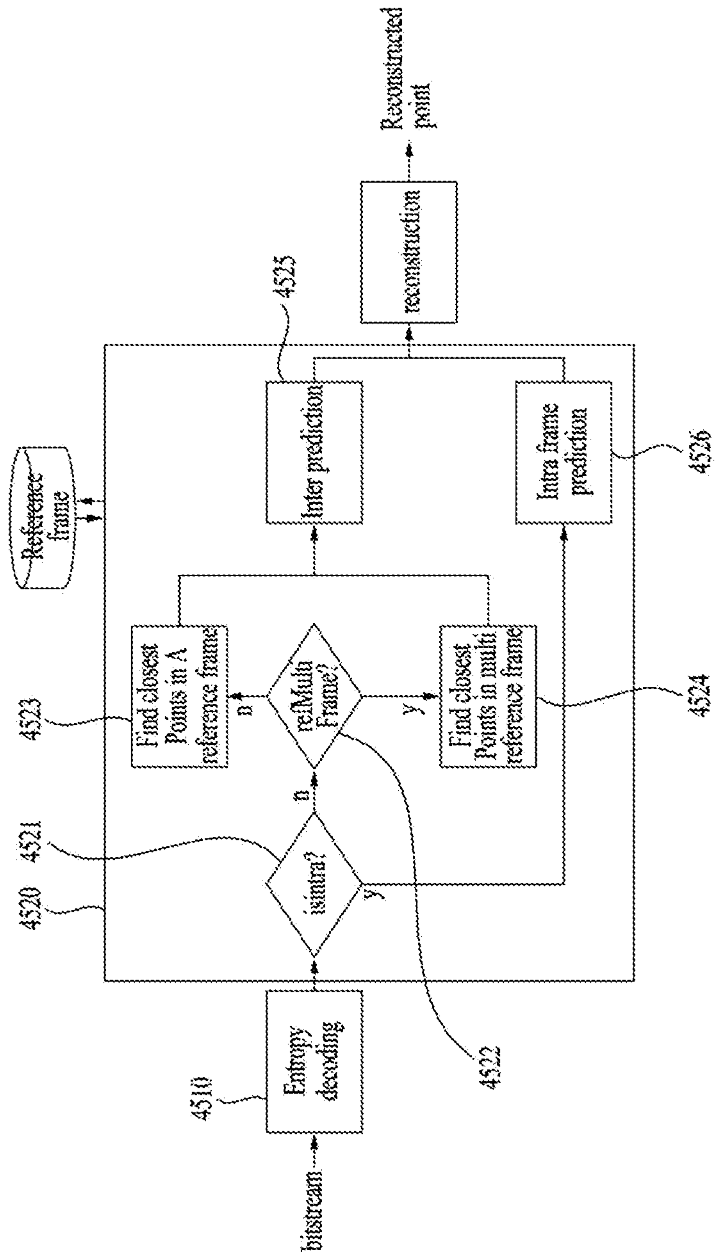
FIG. 45 is a flowchart illustrating a device/method for receiving point cloud data according to embodiments.
Figure 46:
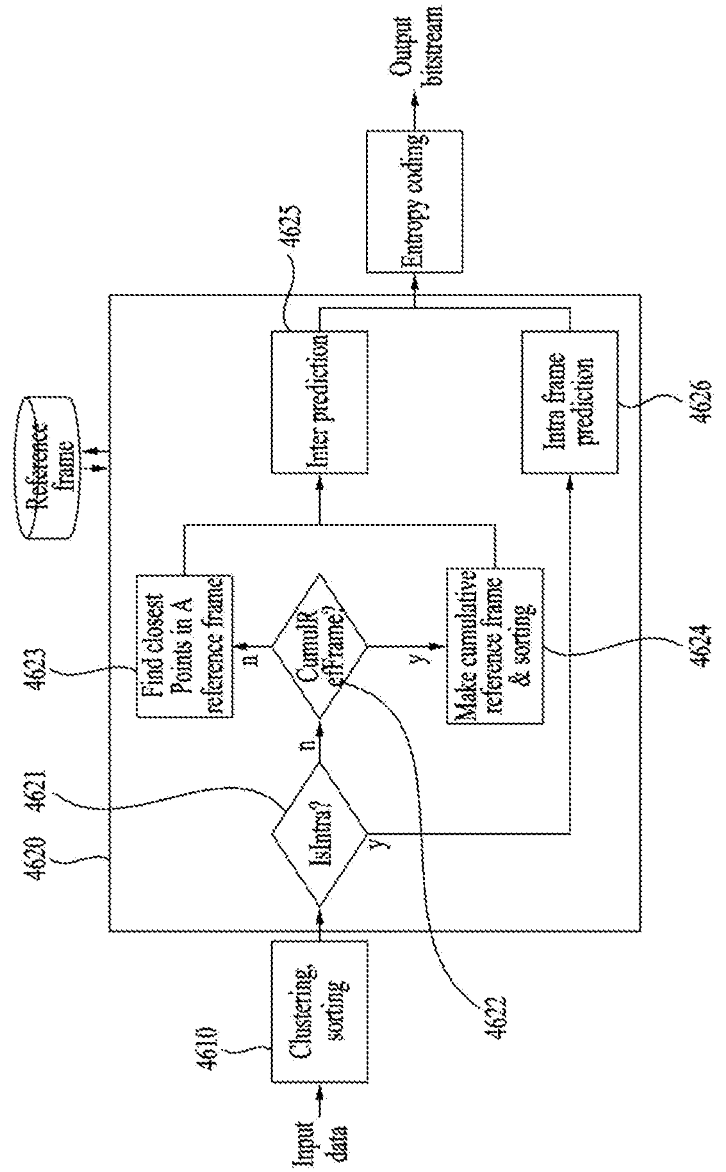
FIG. 46 is a flowchart illustrating a device/method for transmitting point cloud data according to embodiments.
Figure 47:
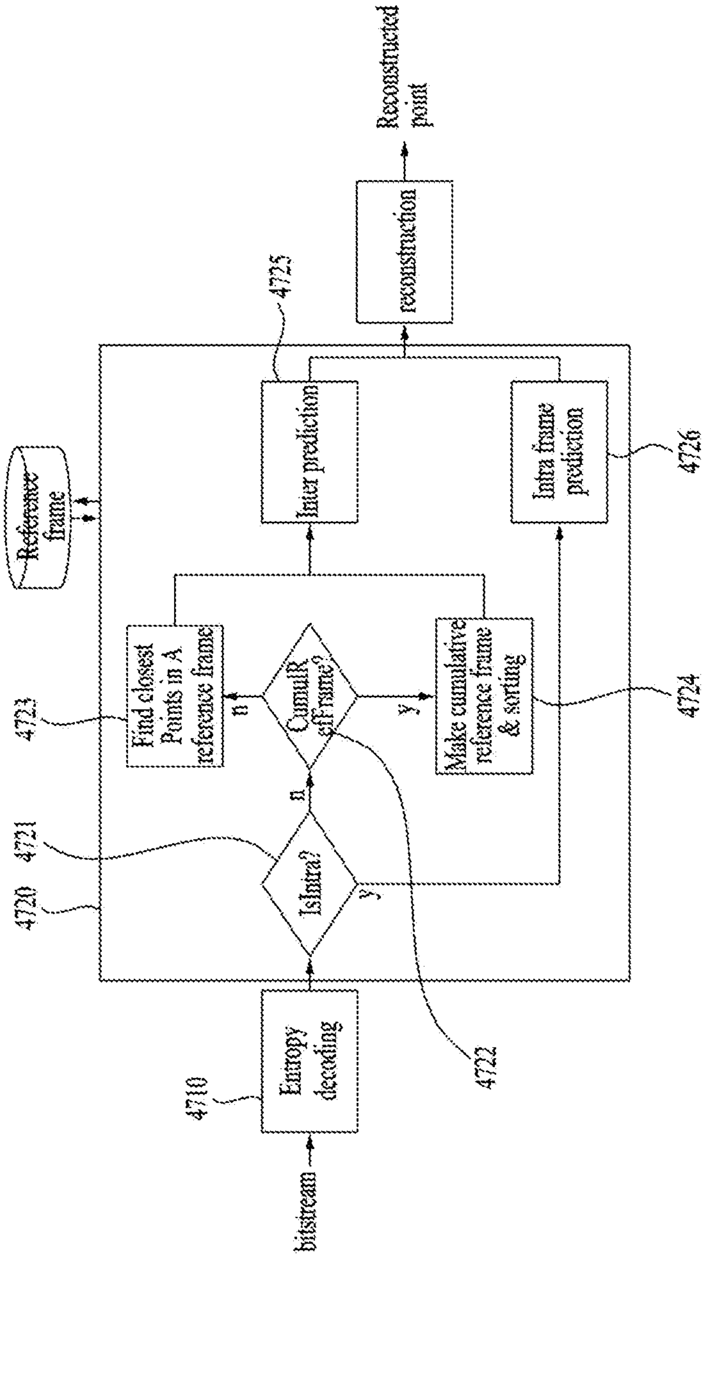
FIG. 47 is a flowchart illustrating a device/method for receiving point cloud data according to embodiments.
Figure 48:
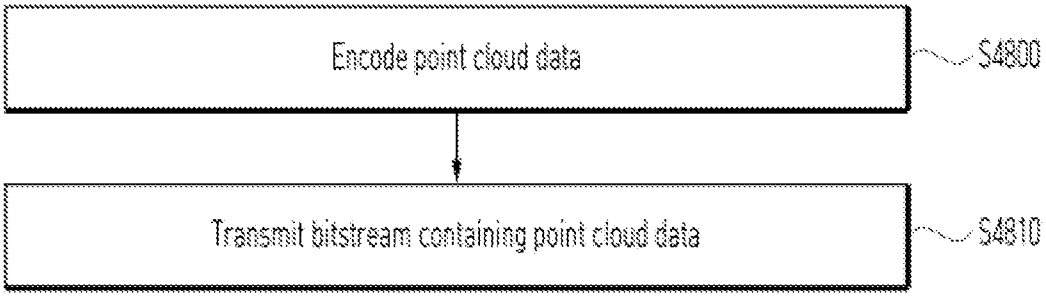
FIG. 48 is a flowchart illustrating a method of transmitting point cloud data according to embodiments.
Figure 49:
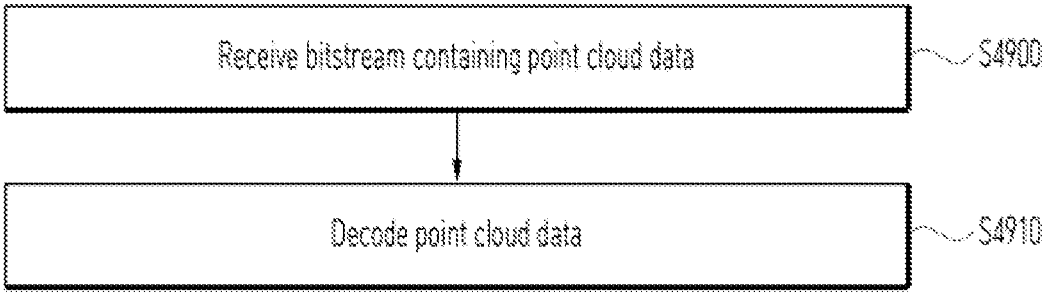
FIG. 49 is a flowchart illustrating a method of receiving point cloud data according to embodiments.

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform the inter-frame prediction described with reference to FIG. 15.

Figure 16:
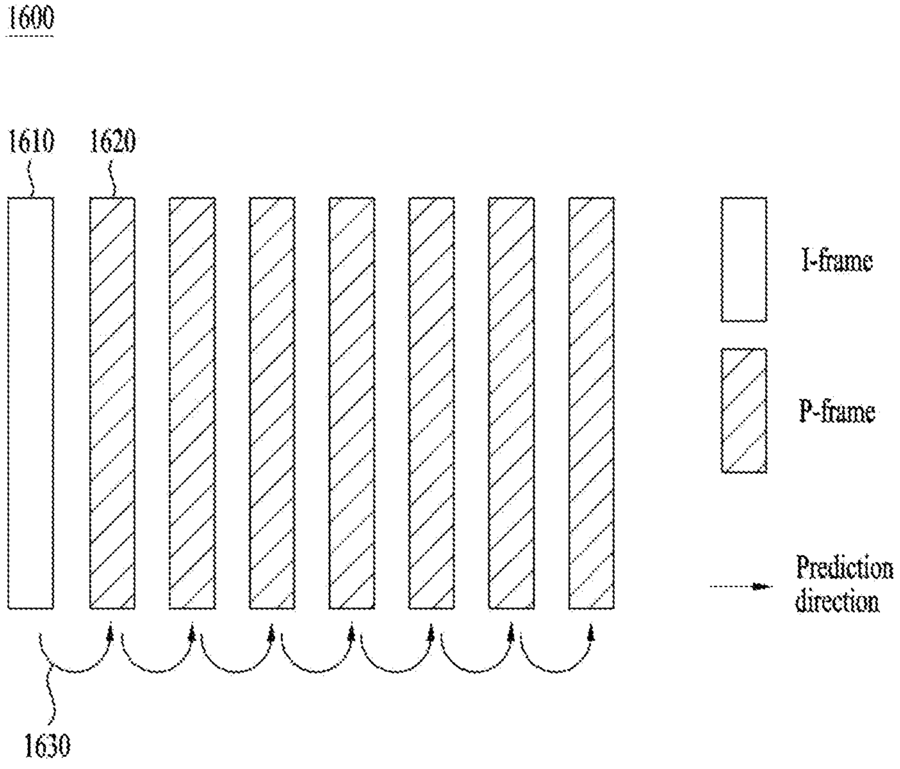
FIG. 16 illustrates a group of frames according to embodiments.

FIG. 16 illustrates a group of frames (GoF) according to embodiments.

The GoF 1600 according to the embodiments represents a group of frames, which may also be referred to as a GoP. The frames constituting the GoF 1600 include an intra frame (I-frame) 1610, a predicted frame (P-frame) 1620, and/or a bi-directional frame (B-frame) (not shown). The I-frame 1610 may represent a frame that does not reference any other frames. The I-frame 1610 is the first frame in the GoF 1600, and thus it has no previous frame and does not reference any other frames. The P-frame 1620 represents a frame that is predicted by referencing the previous frame such as the I-frame 1610, or another frame such as the P-frame 1620. The B-frame may represent a frame predicted by referencing the I-frame 1610 or the P-frame 1620 in both directions.

Referring to FIG. 16, a prediction direction 1630 is shown. The transmission/reception device/method according to embodiments may predict the current frame based on information about the immediately preceding decoded or encoded frame. However, when prediction is performed based solely on the information about the immediately preceding frame, the prediction can only be performed in a single direction even though there is a lot of redundant information between frames, which may not allow for multi-directional prediction and may not allow information about one or more reference frames to be utilization. Accordingly, transmission efficiency may be reduced.

The transmission/reception device/method according to embodiments may perform multi-directional prediction between frames in predicting point cloud data. The transmission/reception device/method according to embodiments may separate the coding order from the display order to utilize one or more reference frames regardless of the display order to predict the point cloud data of the current frame, rather than referencing only the frame coded immediately before the current frame.

The transmission/reception device/method according to embodiments may predict point cloud data with reference to a plurality of frames (or multiple frames) in inter-prediction of predicted geometry (inter-frame prediction).

Further, the transmission/reception device/method according to embodiments may separate the coding order from the display order in inter-prediction of the predicted geometry, and may perform encoding or decoding according to the coding order.

Furthermore, the transmission/reception device/method according to embodiments may distinguish between bi-directional frames and unidirectional frames in predicted geometry inter-prediction (inter-frame prediction).

Further, the transmission/reception device/method according to embodiments may select a favorable prediction direction for each node among bi-directional, unidirectional, forward, and backward (or reverse) predictions in predicting the predicted geometry in a multidirectional frame.

Further, the transmission/reception device/method according to embodiments may determine and signal whether to perform inter-frame or intra-frame prediction for each node in predicting the predicted geometry.

Further, the transmission/reception device/method according to embodiments may re-sort, in display order, the frames decoded in coding order. When prediction is performed based on one or more reference frames, the frame information to be referenced may be stored until prediction of the frame containing the corresponding node ends.

The transmission/reception device/method according to embodiments may generate a single piece of accumulated point cloud data for nearby reference frames selected for inter-frame prediction (inter-prediction).

Further, in the inter-frame prediction (inter-prediction), the transmission/reception device/method according to embodiments may select the most appropriate data from the accumulated reference frame data to predict the current point (or node) in the current frame, and may replace the value of the current point therewith.

Further, the transmission/reception device/method according to embodiments may select the most relevant one or more data from the accumulated reference frame data to generate one piece of node information and use the same as a predicted value for the current node of the current frame.

Further, the transmission/reception device/method according to embodiments may select the most relevant one or more data from the accumulated reference frame data, and group the same to select a prediction direction.

When the transmission/reception device/method according to embodiments utilizes a plurality of reference frames, the method of applying the reference frames may differ depending on whether to use a smaller or larger value than the position, frame identifier, or frame index of the current frame for the display order, frame identifier, or frame index of the reference frames.

When the display order, frame identifier, or frame index of reference frames has a value less than that for the current frame, the transmission/reception device/method according to embodiments may store the one or more reference frames in a buffer.

When the display order, frame identifier, or frame index of the reference frames has a value greater than that for the current frame, a coding order may be defined separately from the display order. The coding order of frames according to embodiments may vary from one GOF to another or may be fixed to a certain order.

When the current frame is predicted using one or more reference frames, it may be signaled to the transmission and reception devices according to embodiments whether the positions of the reference frames are all ahead of the current frame in display order, are bi-directionally divided into the front and back of the current frame in display order, or are all behind the current frame. Further, whether only a single reference frame is used or multiple reference frames are used may be signaled.

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform the inter-frame prediction described in relation to FIG. 16.

Figure 17:
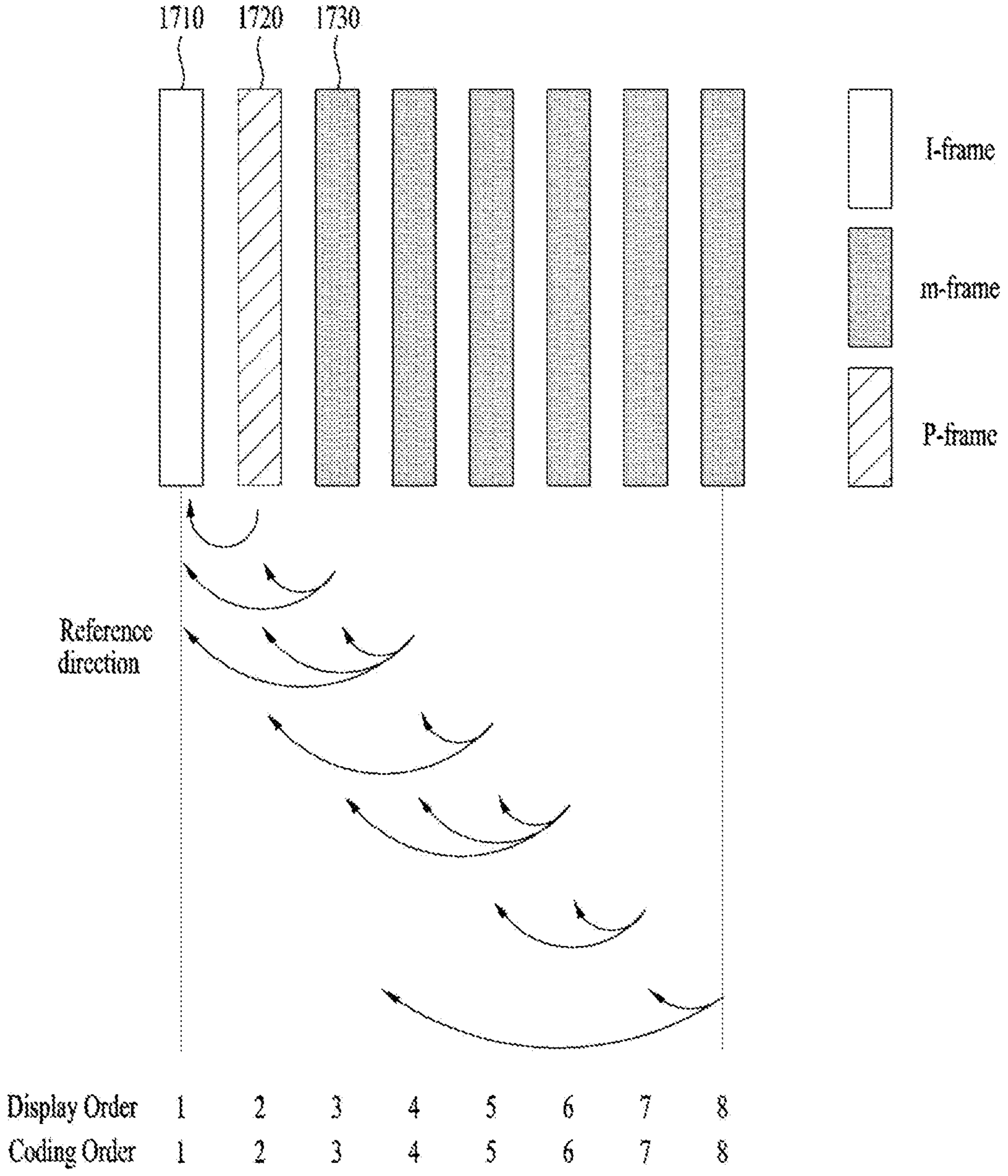
FIG. 17 illustrates a method for forward reference for inter-frame prediction according to embodiments.

FIG. 17 illustrates a method for forward reference for inter-frame prediction according to embodiments. FIG. 17 illustrates types of a plurality of frame, directions of referencing between frames, display order of frames, and coding order of frames according to embodiments.

Referring to FIG. 17, an m-frame 1730 may represent a frame that references multiple frames. For example, an m-frame 1730 at the third position in display order may reference an I-frame 1710 at the first position and a P-frame 1720 at the second position in display order.

Forward prediction: In referencing multiple frames, the display order and coding order may be the same if reference frames are selected from among the frames coded first, as shown in FIG. 17. A highly relevant reference frame may not be immediately next to the current frame in display order. The forward prediction may refer to a prediction method for referencing at least one of the frames that precede the current frame in display order.

Furthermore, when an I-frame is a frame for which only inter-prediction is allowed, and a P-frame uses only a single reference frame in the forward direction, an m-frame may utilize information about one or more reference frames regardless of the referencing direction.

Referring to FIG. 17, the display order and coding order of a plurality of frames are the same. Also, except for the I-frame 1710, the frames (P-frame or m-frames) may reference preceding frames in display order or coding order. For example, a frame at the eighth position in display order may reference a frame at the seventh position and a frame at the fourth position in display order. That is, to predict the current point in the frame at the eighth position in display order, points in the frames at the sixth and seventh positions in display order may be referenced.

Figure 18:
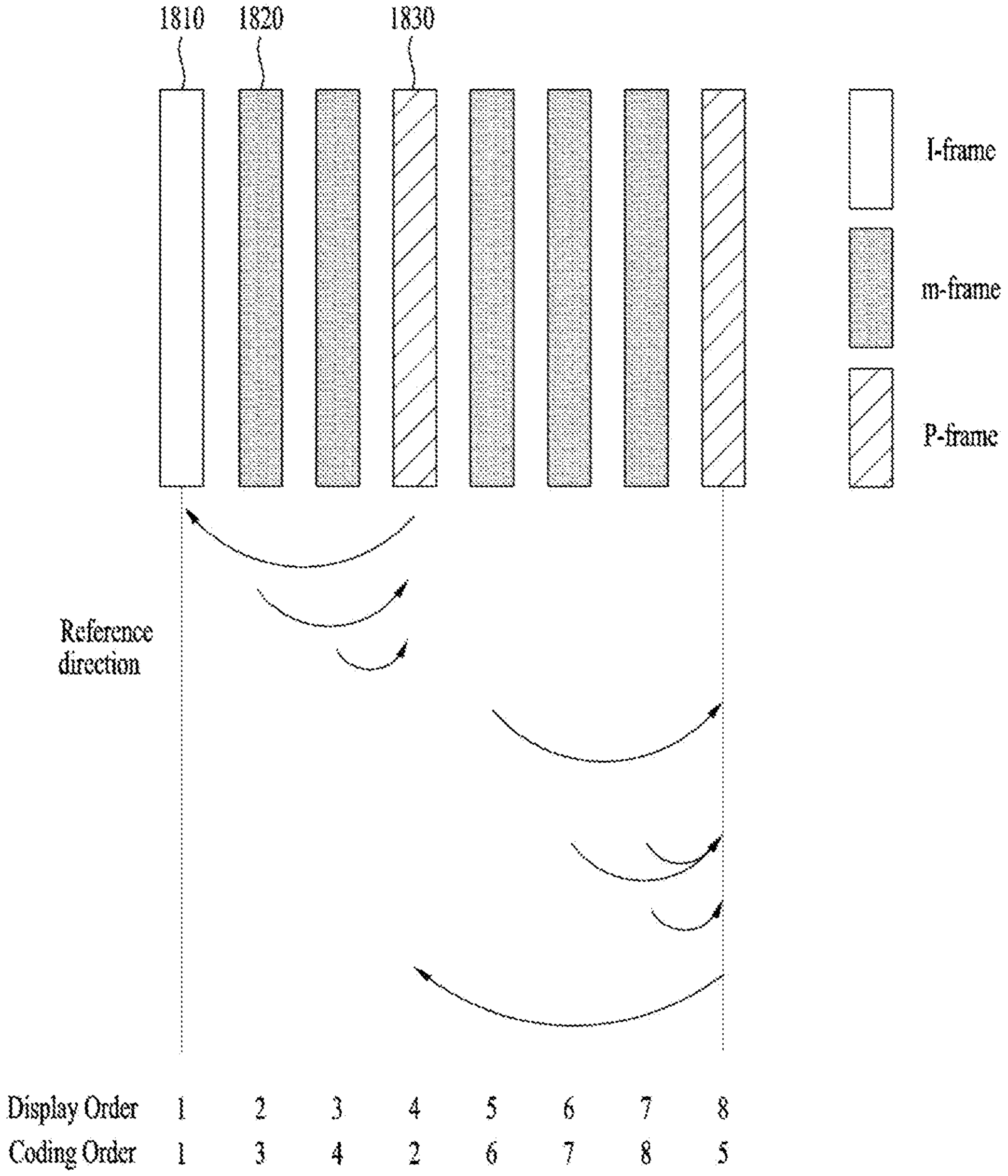
FIG. 18 illustrates a method for backward reference for inter-frame prediction according to embodiments.

FIG. 18 illustrates a method for backward (or rearward) reference for inter-frame prediction according to embodiments. In other words, the figure illustrates an embodiment of prediction using a reference frame positioned on the backward side.

Referring to FIG. 18, the position of a referenced frame is identified by the referencing direction. The transmission/reception device/method according to the embodiments may code an I frame 1810 in the GOF, predict a P-frame 1830 that references only a single frame in the forward direction by referencing the I-frame 1810, and then predict an m frame 1820 between the I-frame and the P-frame based on the information about the P-frame 1830 and the first coded m frame. In this case, the display order and the coding order may be different, and the referencing direction may depend on the specified positions of the m-frames and the P-frame.

Referring to FIG. 18, the transmission/reception device/method according to embodiments may predict the current frame by referencing a frame that is positioned further back in display order. For example, a frame at the second position in display order may reference a frame at the fourth position in display order to predict the current point. In other words, a point in the frame at the fourth position in display order may be referenced to predict a current point in the frame at the second position in display order.

Figure 19:
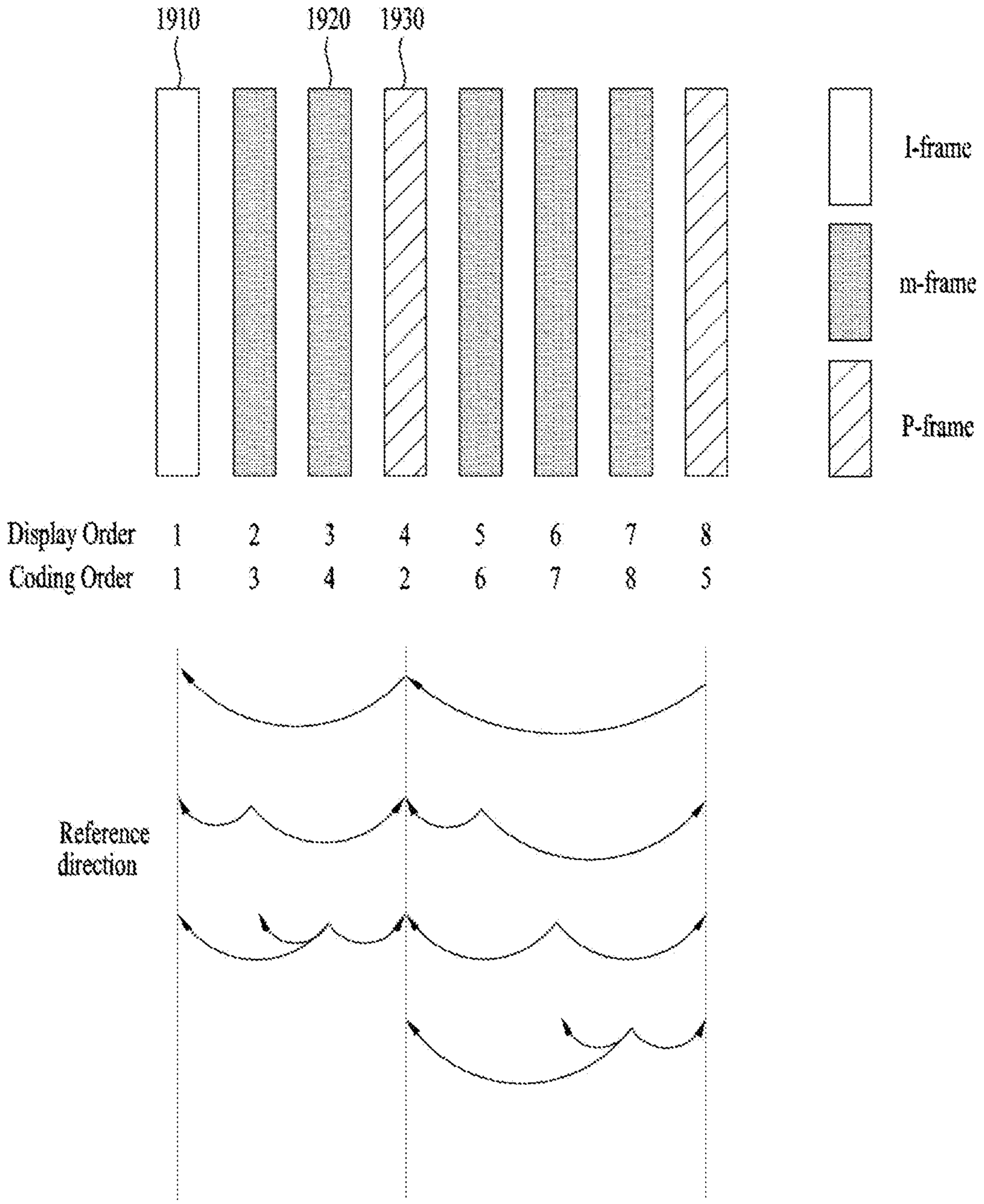
FIG. 19 illustrates a method for bi-directional reference for inter-frame prediction according to embodiments.

FIG. 19 illustrates a method for bi-directional reference for inter-frame prediction according to embodiments. Referring to FIG. 19, an m-frame 1920 references frames positioned on the forward and backward sides in display order.

When the m-frame 1920 allows for bi-directional referencing, the transmission and reception devices according to embodiments may first code the I-frame 1910 and the P-frame 1930, and then predict the m-frame 1920 between the I-frame 1910 and the P-frame 1930 based on the bi-directional information. At this time, if a previously coded m-frame is present, it may also be added and used as a reference frame.

Referring to FIG. 19, the transmission/reception device/method according to embodiments may predict the current frame by referencing frames positioned on the forward and backward sides in display order. For example, a frame at the second position in display order may predict a current point by referencing frames at the first and fourth positions in display order. In other words, to predict a current point in a frame at the second position in display order, a point in a frame at the first position in display order and a point in a frame at the fourth position in display order may be referenced.

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform the inter-frame prediction described with reference to FIGS. 17 to 19.

In accordance with the three referencing directions described above, when a reference frame is referenced by one or more frames, the information about the reference frame may be stored in a separate buffer until its use is complete. The information about the reference frame may be deleted from the buffer after it use is complete.

The method of referencing multiple frames may be applied to geometry prediction, attribute prediction, and the like according to embodiments. In inter-frame prediction (inter-prediction) of geometry and attributes, the reference frame information may be divided and used or the same reference frame may be used.

While the reference between multiple frames according to embodiments has been described according to the forward, backward, and bi-directional methods, a combination of methods may be applied in the same sequence.

Hereinafter, methods of predicting nodes based on a plurality of reference frames according to embodiments will be described. The nodes according to the embodiments may be referred to as points.

The following prediction methods may be applied to inter-prediction of point cloud data according to embodiments, based on a plurality of reference frames. The prediction methods according to the embodiments may be applied to inter-frame prediction of predictive geometry.

Figure 20:
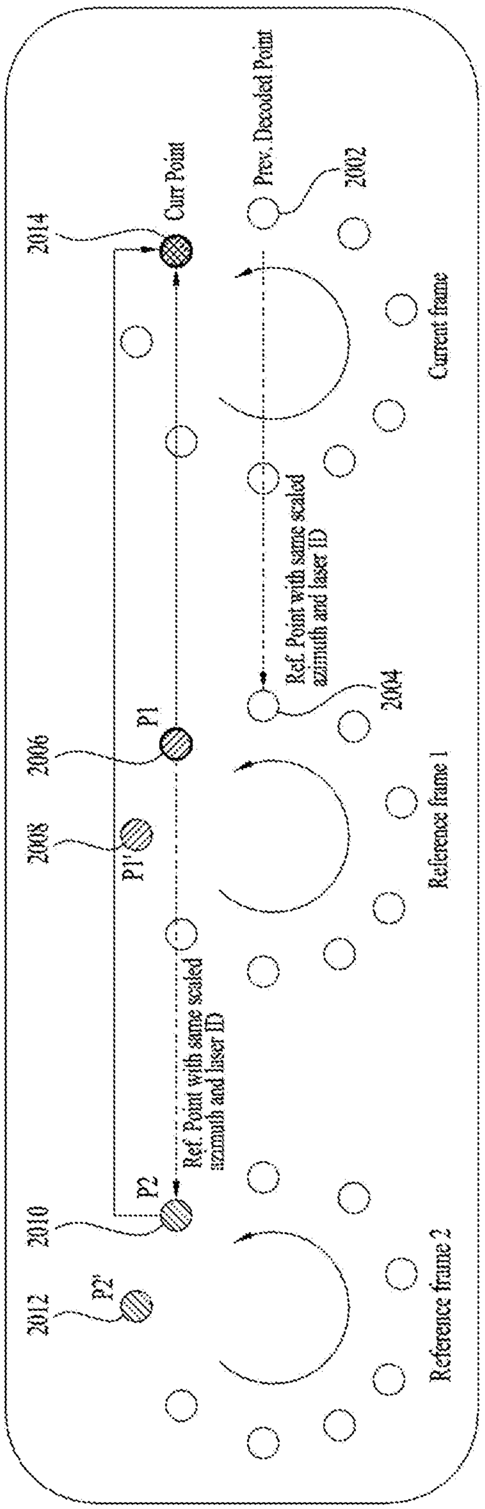
FIG. 20 illustrates forward inter prediction according to embodiments.

FIG. 20 illustrates forward inter prediction according to embodiments.

Forward Prediction

Referring to FIG. 20, a reference frame closest in display order to the current frame is referred to as reference frame 1, and the next closest reference frame is referred to as reference frame 2.

In order to predict a point (or node) 2014 that is to be predicted in the current frame, the transmission/reception device/method according to the embodiments searches for a point in reference frame 1 having the same laser ID and similar azimuth to a previously decoded point (Prev.Point) 2002, and determines the closest of the points having a radius greater than that of the Prev.Point 2002 in reference frame 1 as a first predictor (P1) 2006, and the next closest point as a second predictor (P1') 2008. Then, in reference frame 2, a point having the same laser ID, similar azimuth, and the most similar radius to P1 2006 is determined as a third predictor (P2) 2010, and the closest point having the same laser ID and similar azimuth to P2 2010 and a radius greater than P2 2010 is determined as a fourth predictor (P2') 2012.

The transmission/reception device/method according to embodiments may set the predictor that is most similar to the current point 2014 among the four predictors as a predicted value, or may find the best combination that is most similar to the current point 2014 among the combination of P1 2006 and P2 2010, the combination of P1 2006 and P2' 2012, the combination of P1' 2008 and P2 2010, and the combination of P1' 2008 and P2' 2012 and use the same as a predicted value for the current point 2014. Alternatively, the transmission/reception device/method according to embodiments may calculate a representative value (e.g., average) of the predictors found in each reference frame, and then compare each of the representative values with the current point (or current node), or calculate a predicted value from a combination of the representative values. In predicting the current point information by combining information about two or more predictors, the predicted value may be calculated by applying an arithmetic mean, a geometric mean, a weight based on a difference in display order, or the like.

In order to predict the current point 2014 in the current frame, the transmission/reception device/method according to embodiments may find a second point 2004 having the same laser ID and similar azimuth in reference frame 1 based on the previously decoded first point 2002 in the current frame. Then, the closest point, the third point 2006, among the points having a radius greater than that of the first point 2002 in reference frame 1 may be determined as a first predictor (P1) 2006 or a first candidate point (P1) 2006, and the next closest point, the fourth point 2008, may be determined as a second predictor (P1') 2008. Then, in reference frame 2, a fifth point 2010 having the same laser ID, similar azimuth and the closest radius to the first predictor 2006 may be determined as a third predictor (P2) 2010, and the closest point 2012 among the points having the same laser ID and similar azimuth and having a radius greater than that of the fifth point 2010 may be determined as a fourth predictor (P2') 2012.

The transmission/reception device/method according to embodiments may independently compare the four predictors or candidate points with the current point and determine the closest predictor as a predicted value, or may determine the predicted value of the current point 2014 based on a combination of two or more of the four predictors. For example, the average of the predictors found in each reference frame may be calculated and compared with the current point 2014, or the current point 2014 may be predicted based on a combination of the averages.

Figure 21:
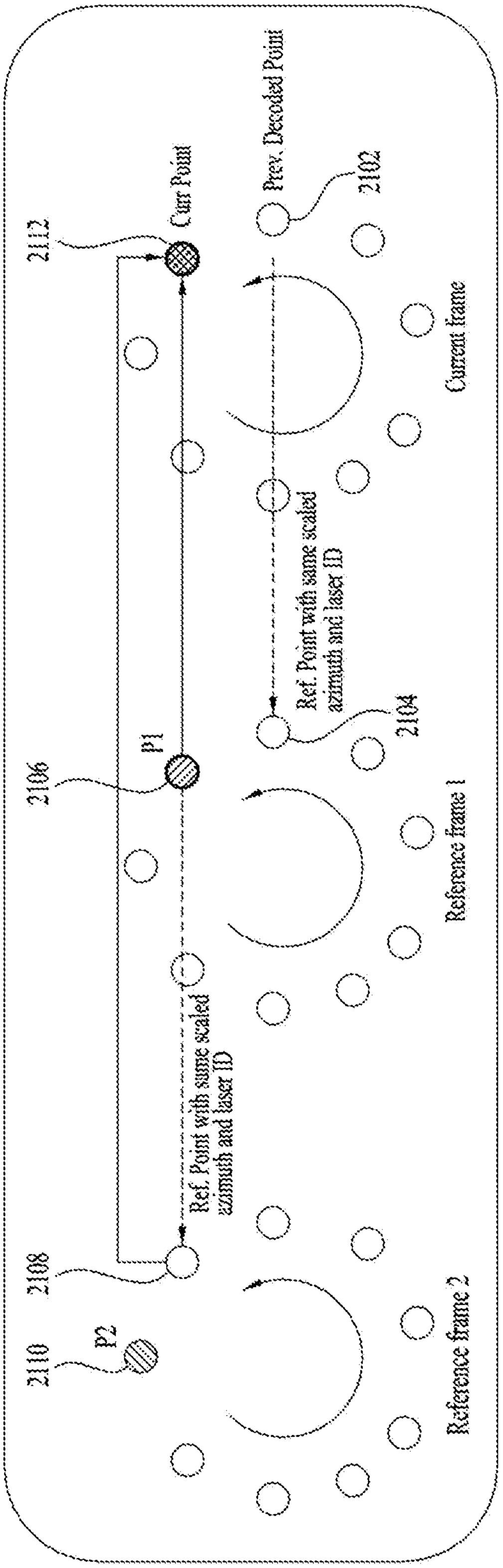
FIG. 21 illustrates forward inter prediction according to embodiments.

FIG. 21 illustrates forward inter prediction according to embodiments.

Referring to FIG. 21, a reference frame closest in display order to the current frame is referred to as reference frame 1, and the next closest reference frame is referred to as reference frame 2.

In order to predict a point (or node) 2112 that is to be predicted in the current frame, the transmission/reception device/method according to embodiments search for a point 2104 having the same laser ID and similar azimuth in reference frame 1 based on a prev. decoded point (Prev.Point) 2102, which is a point decoded before the point to be predicted in the current point, determine the closest point among the points having a radius greater than that of the Prev.Point 2102 as a first predictor (P1) 2106, and then determine, as a second predictor (P2) 2110, the closest one of the points having the same laser ID, similar azimuth, and large radius based on a point 2108 having the same laser ID, a similar azimuth, and the most similar radius to the point 2106 in reference frame 2.

The transmission/reception device/method according to embodiments may compare each of P1 2106 and P2 2110 with the current point 2112 in the current frame to select the closest value, or may find the best case among a total of three conditions including a combination of P1 2106 and P2 2110 and use the same as the predicted value of the current point. In predicting the current point information by combining two or more pieces of predictor information, the predicted value may be calculated by applying an arithmetic mean, a geometric mean, a weight based on a difference in display order, or the like.

To predict the current point 2112 in the current frame, the transmission/reception device/method according to embodiments may find a second point 2104 having the same laser ID and similar azimuth in reference frame 1 based on the previously decoded first point 2102 in the current frame. Then, the closest point, the third point 2106, among the points having a radius greater than that of the first point 2102 in reference frame 1 may be determined as a first predictor (P1) 2106 or a first candidate point (P1) 2106. Then, in reference frame 2, a fourth point 2108 having the same laser ID, similar azimuth and the closest radius to the first predictor 2006 may be searched for, and the closest point 2110 among the points having the same laser ID and similar azimuth to the fourth point 2108 and having a radius greater than that of the fourth point 2108 may be determined as a second predictor (P2) 2110.

The transmission/reception device/method according to embodiments may independently compare each of the first predictor 2106 and the second predictor 2110 with the current point 2112 and determine the closest predictor as the predicted value, or may determine the predicted value of the current point 2112 based on three methods including a combination of the predictors.

Figure 22:
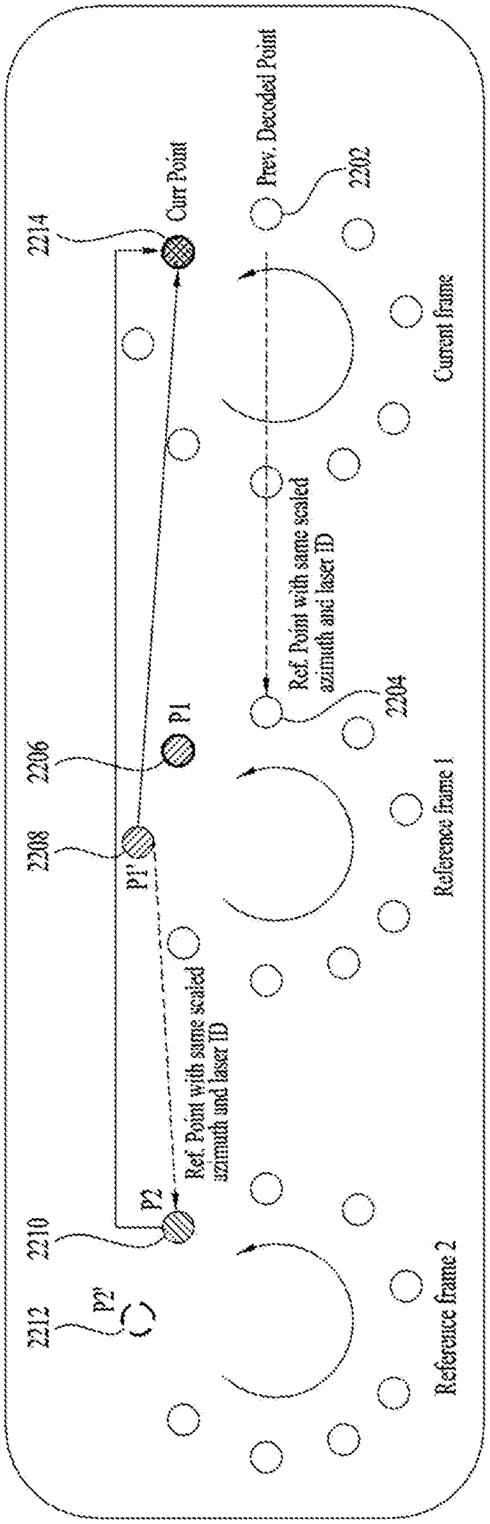
FIG. 22 illustrates forward inter prediction according to embodiments.

FIG. 22 illustrates forward inter prediction according to embodiments.

Referring to FIG. 22, a reference frame closest in display order to the current frame is referred to as reference frame 1, and the next closest reference frame is referred to as reference frame 2.

In order to predict a point (or node) 2214 that is to be predicted in the current frame, the transmission/reception device/method according to embodiments search for a point 2204 having the same laser ID and similar azimuth in reference frame 1 based on a prev. decoded point (Prev.Point) 2202, which is a point decoded before the point to be predicted in the current point, determine the closest point among the points having a radius greater than that of the Prev.Point 2202 as a first predictor (P1) 2206, and determine the next closest point as a second predictor (P1') 2208. Then, the transmission/reception device/method determine, in reference frame 2, a point having the same laser ID, similar azimuth, and most similar radius to P1' 2208 as a third predictor (P2) 2210, and determine the closest point among the points having the same laser ID, a similar azimuth and a radius greater than that of P2 2210 as a fourth predictor (P2') 2212.

The transmission and reception devices according to embodiments may compare P2 2210 and P1' 2208 with the current point and determine and signal a predictor having the closest value to the current point as a predicted value, or may calculate the predicted value based on a combination of P1' 2208 and P2 2210. Further, they may determine one or both of P2' 2212 and P1 2206 as candidate points, as needed. Further, in predicting the current point information by combining two or more predictors, the predicted value may be calculated by applying an arithmetic mean, a geometric mean, a weight based on a difference in display order, or the like.

To predict the current point 2214 in the current frame, the transmission/reception device/method according to embodiments may find a second point 2204 having the same laser ID and similar azimuth in reference frame 1 based on the previously decoded first point 2202 in the current frame. Then, the closest point, the third point 2206, among the points having a radius greater than that of the first point 2202 in reference frame 1 may be determined as a first predictor (P1) 2206 or a first candidate point (P1) 2206, and the next closest point, the fourth point 2208, may be determined as a second predictor (P1') 2208. Then, in reference frame 2, a fifth point 2210 having the same laser ID, similar azimuth and the closest radius to the second predictor 2208 may be determined as a third predictor (P2) 2210, and the closest point 2212 among the points having the same laser ID and similar azimuth and having a radius greater than that of the fifth point 2210 may be determined as a fourth predictor (P2') 2212.

The transmission/reception device/method according to embodiments may independently compare the four predictors or candidate points with the current point and determine the closest predictor as a predicted value, or may determine the predicted value of the current point 2214 based on a combination of two or more of the four predictors. For example, the average of the predictors found in each reference frame may be calculated and compared with the current point 2214, or the current point 2214 may be predicted based on a combination of the averages.

Figure 23:
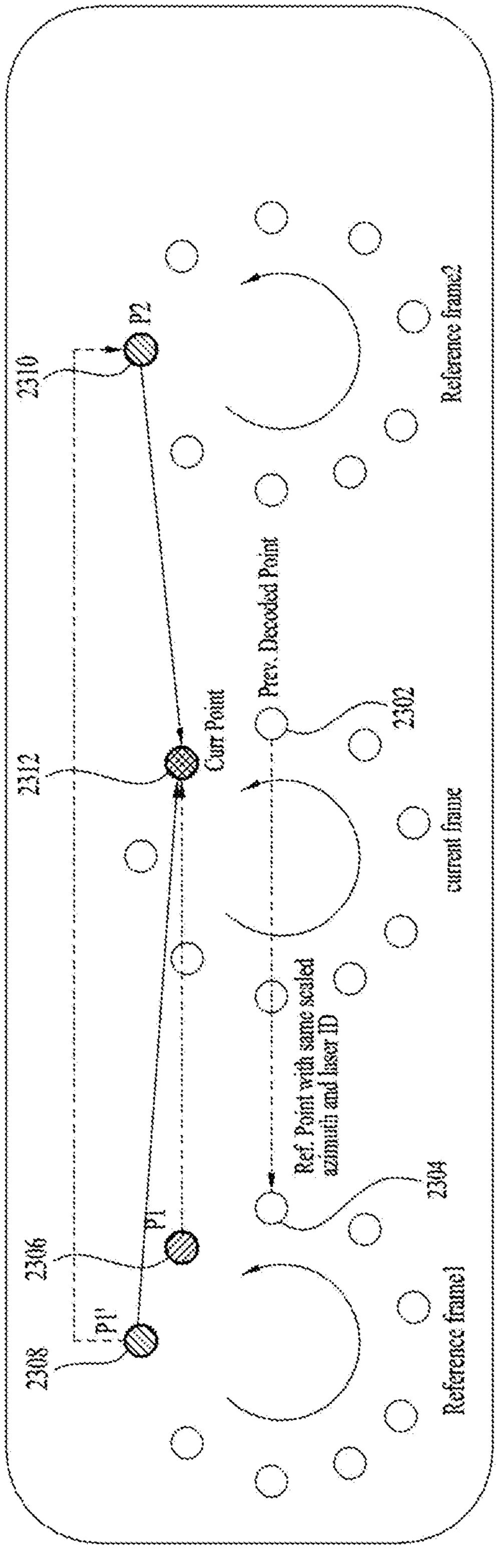
FIG. 23 illustrates bi-directional inter prediction according to embodiments.

FIG. 23 illustrates bi-directional inter prediction according to embodiments.

Referring to FIG. 23, a reference frame that precedes the current frame in display order may be referred to as reference frame 1, and a reference frame that is later than the current frame in display order may be referred to as reference frame 2. Reference frame 2 is positioned behind the current frame in display order.

In order to predict a point (or node) 2312 that is to be predicted in the current frame, the transmission and reception devices according to embodiments search for a point 2304 having the same laser ID and similar azimuth in reference frame 1 based on a prev. decoded point (Prev.Point) 2302, which is a point decoded before the point to be predicted in the current frame, determine the closest point among the points having a radius greater than that of the Prev.Point 2302 as a first predictor (P1) 2306, and determine the next closest point as a second predictor (P1') 2308. Then, the transmission and reception devices determine, in reference frame 2, a point having the same laser ID, similar azimuth, and most similar radius to P1' 2308 as a third predictor (P2) 2310. The transmission and reception devices may independently compare each of the two predictors, P1' 2308 and P2 2310, with the current point, and set the predictor that is most similar to the current point as a predicted value. Alternatively, they may determine the best case among the two predictors and a combination of P1' 2308 and P2 2310 as the predicted value. Further, in predicting the current point information by combining two or more predictors, the predicted value may be calculated by applying an arithmetic mean, a geometric mean, a weight based on a difference in display order, or the like.

To predict the current point 2312 in the current frame, the transmission/reception device/method according to embodiments may find a second point 2304 having the same laser ID and similar azimuth in reference frame 1 based on the previously decoded first point 2302 in the current frame. Then, the closest point, the third point 2306, among the points having a radius greater than that of the first point 2302 in reference frame 1 may be determined as a first predictor (P1) 2306 or a first candidate point (P1) 2306, and the next closest point, the fourth point 2308, may be determined as a second predictor (P1') 2308. Then, in reference frame 2, a fifth point 2210 having the same laser ID, similar azimuth and the closest radius to the second predictor 2308 may be found and determined as a third predictor (P2) 2310.

The transmission/reception device/method according to embodiments may independently compare the four predictors or candidate points with the current point and determine the closest predictor as a predicted value, or may determine the predicted value of the current point 2214 based on a combination of two or more of the four predictors. For example, the average of the predictors found in each reference frame may be calculated and compared with the current point 2214, or the current point 2214 may be predicted based on a combination of the averages.

Figure 24:
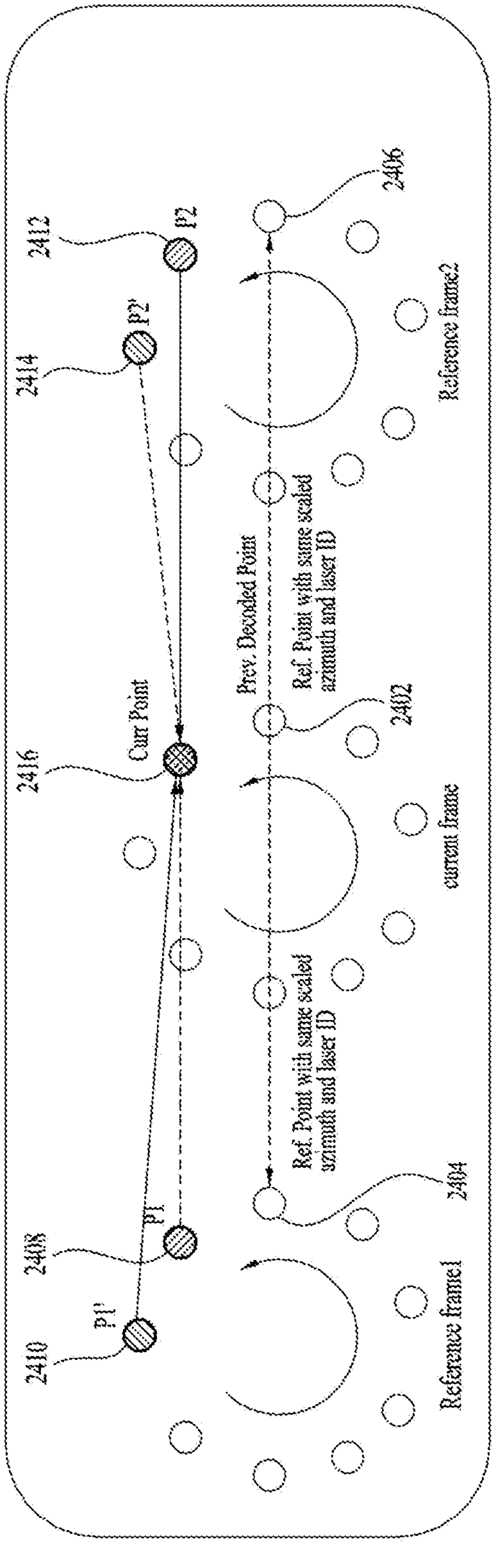
FIG. 24 illustrates bi-directional inter prediction according to embodiments.

FIG. 24 illustrates bi-directional inter prediction according to embodiments.

Referring to FIG. 24, a reference frame that precedes the current frame in display order may be referred to as reference frame 1, and a reference frame that is later than the current frame in display order may be referred to as reference frame 2. Reference frame 2 is positioned behind the current frame in display order.

In order to predict a point (or node) 2416 that is to be predicted in the current frame, the transmission and reception devices according to embodiments search for a point 2404 having the same laser ID and similar azimuth in reference frame 1 based on a prev. decoded point (Prev.Point) 2402, which is a point decoded before the point to be predicted in the current frame, determine the closest point among the points having a radius greater than that of the Prev.Point 2402 as a first predictor (P1) 2408, and determine the next closest point as a second predictor (P1') 2410. Then, based on the prev. decoded point (Prev.Point) 2402 in reference frame 2, a point 2406 having the same laser ID, similar azimuth, and most similar radius is found, and a point exhibiting the smallest difference from the point 2406 among the points having a radius greater than that of the point 2406 is determined as P2 2412. P2' 2414 is determined to be the closest point among the points having a radius greater than that of P2 2412.

In predicting the current point (or node) 2416 of the current frame, the transmission and reception devices according to embodiments may compare the four predictors P1, P1', P2, and P2' individually or select the best candidate from among combinations of two of the predictors. In predicting the current point information by combining two or more pieces of predictor information, the predicted value may be calculated by applying an arithmetic mean, a geometric mean, a weight based on a difference in display order, or the like.

In order to predict the current point 2416 in the current frame, the transmission/reception device/method according to embodiments may find a second point 2404 having the same laser ID and similar azimuth in reference frame 1 based on the previously decoded first point 2402 in the current frame. Then, the closest point, the third point 2408, among the points having a radius greater than that of the first point 2402 in reference frame 1 may be determined as a first predictor (P1) 2408 or a first candidate point (P1) 2408, and the next closest point, the fourth point 2410, may be determined as a second predictor (P1') 2410. Then, in reference frame 2, a fifth point 2406 having the same laser ID, similar azimuth, and most similar radius based on the first point 2402 may be found, and a point exhibiting the smallest difference from the fifth point 2402 among the points having a greater radius than the fifth point 2406 may be determined as a third predictor (P2) 2412, and a point exhibiting the second smallest difference may be determined as a fourth predictor (P2') 2414.

The transmission/reception device/method according to embodiments may independently compare the four predictors or candidate points with the current point and determine the closest predictor as a predicted value, or may determine the predicted value of the current point 2416 based on a combination of two or more of the four predictors. For example, the average of the predictors found in each reference frame may be calculated and compared with the current point 2416, or the current point 2416 may be predicted based on a combination of the averages.

Figure 25:
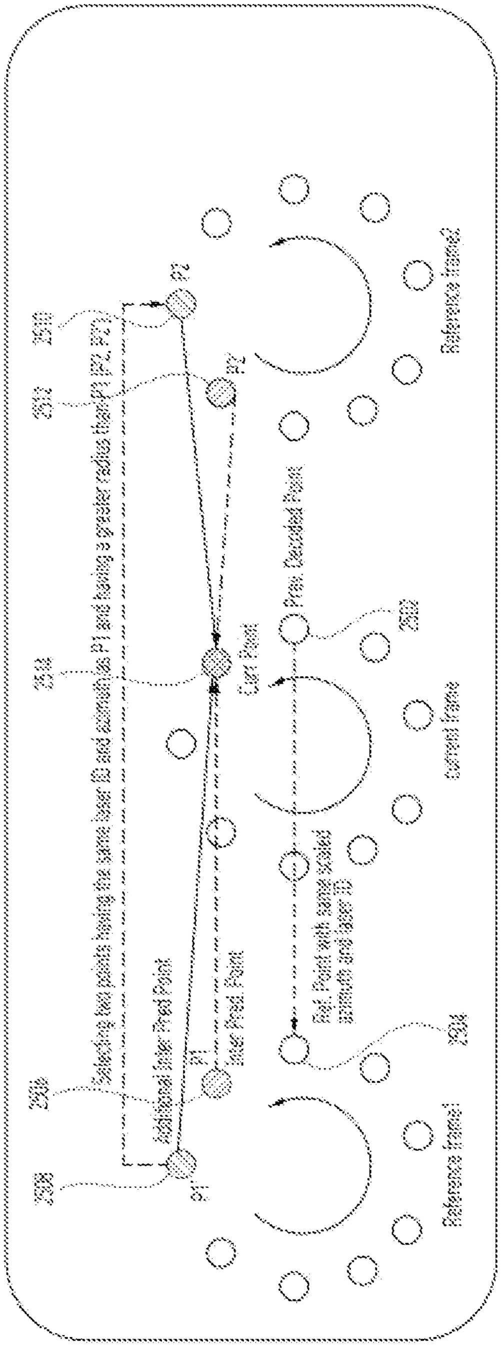
FIG. 25 illustrates bi-directional inter prediction according to embodiments.

FIG. 25 illustrates bi-directional inter prediction according to embodiments.

Referring to FIG. 25, a reference frame that precedes the current frame in display order may be referred to as reference frame 1, and a reference frame that is later than the current frame in display order may be referred to as reference frame 2. Reference frame 2 is positioned behind the current frame in display order.

In order to predict a point (or node) 2514 that is to be predicted in the current frame, the transmission and reception devices according to embodiments may search for a point 2504 having the same laser ID and similar azimuth in reference frame 1 based on a prev. decoded point (Prev.Point) 2502, which is a point decoded before the point to be predicted in the current frame, determine the closest point among the points having a radius greater than that of the Prev.Point 2502 as a first predictor (P1) 2506, and determine the next closest point as a second predictor (P1') 2508. Then, in reference frame 2, points having the same laser ID and similar azimuths to the prev. decoded point (Prev.Point) 2502 and P1 2506 and having radii greater than those of P1 2506 and Prev.Point 2502 may be selected in order and designated as P2 2510 and P2' 2512, respectively.

In predicting the current point (or node) 2514 of the current frame, the transmission and reception devices according to embodiments may compare the four predictors P1, P1', P2, and P2' individually or select the best candidate from among combinations of two of the predictors. In predicting the current point information by combining two or more pieces of predictor information, the predicted value may be calculated by applying an arithmetic mean, a geometric mean, a weight based on a difference in display order, or the like.

In order to predict the current point 2514 in the current frame, the transmission/reception device/method according to embodiments may find a second point 2504 having the same laser ID and similar azimuth in reference frame 1 based on the previously decoded first point 2502 in the current frame. Then, the closest point, the third point 2506, among the points having a radius greater than that of the first point 2502 in reference frame 1 may be determined as a first predictor (P1) 2506 or a first candidate point (P1) 2506, and the next closest point, the fourth point 2508, may be determined as a second predictor (P1') 2508. Then, in reference frame 2, points having the same laser ID and similar azimuths based on the first point 2502 and having radii greater than those of the third point 2506 and the first point 2502 may be selected in order and determined as a third predictor (P2) 2510 and a fourth predictor (P2') 2512.

Figure 26:
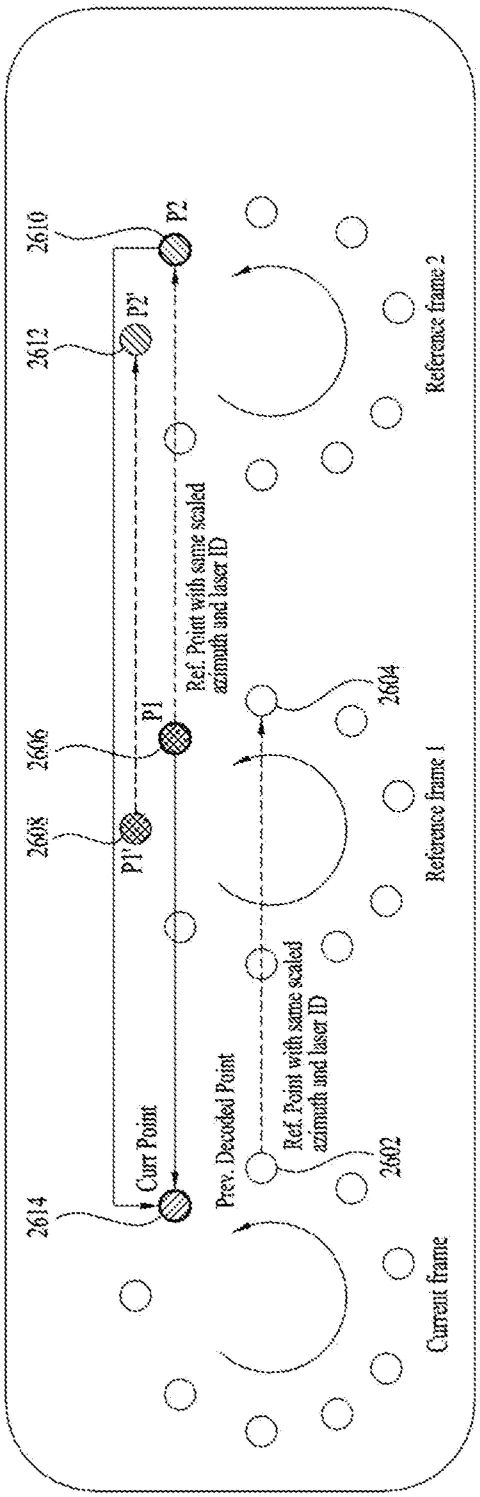
FIG. 26 illustrates backward inter prediction according to embodiments.

FIG. 26 illustrates backward inter prediction according to embodiments.

Referring to FIG. 26, among frames that are later than the current frame in display order, a reference frame that is closer to the current frame may be referred to as reference frame 1, and a reference frame that is later than the current frame and reference frame 1 in display order may be referred to as reference frame 2. Reference frame 2 is positioned after reference frame 1 in display order.

In order to predict a point (or node) 2614 that is to be predicted in the current frame, the transmission and reception devices according to embodiments may search for a point 2604 having the same laser ID and similar azimuth in reference frame 1 based on a prev. decoded point (Prev.Point) 2602, which is a point decoded before the point to be predicted in the current frame, determine the closest point among the points having a radius greater than that of the Prev.Point 2602 as a first predictor (P1) 2606, and determine the next closest point as a second predictor (P1') 2608. Then, in reference frame 2, points having laser ID and a similar azimuth to P1 2606 and P1' 2608 and having a radius value most similar to those of P1 2606 and P1' 2608 may be searched for and determined as P2 2610 and P2' 2612, respectively.

In predicting the current point (or node) 2614 of the current frame, the transmission and reception devices according to embodiments may compare the four predictors P1, P1', P2, and P2' individually or select the best candidate from among combinations of two of the predictors. In predicting the current point information by combining two or more pieces of predictor information, the predicted value may be calculated by applying an arithmetic mean, a geometric mean, a weight based on a difference in display order, or the like.

In order to predict the current point 2614 in the current frame, the transmission/reception device/method according to embodiments may find a second point 2604 having the same laser ID and similar azimuth in reference frame 1 based on the previously decoded first point 2602 in the current frame. Then, the closest point, the third point 2606, among the points having a radius greater than that of the first point 2602 in reference frame 1 may be determined as a first predictor (P1) 2606 or a first candidate point (P1) 2606, and the next closest point, the fourth point 2608, may be determined as a second predictor (P1') 2608. Then, in reference frame 2, points having the same laser ID and similar azimuths based on the third point 2606 and the fourth point 2608 and having radii closest to those of the third point 2606 and the fourth point 2608 may be found and determined as a third predictor (P2) 2610 and a fourth predictor (P2') 2612.

Figure 27:
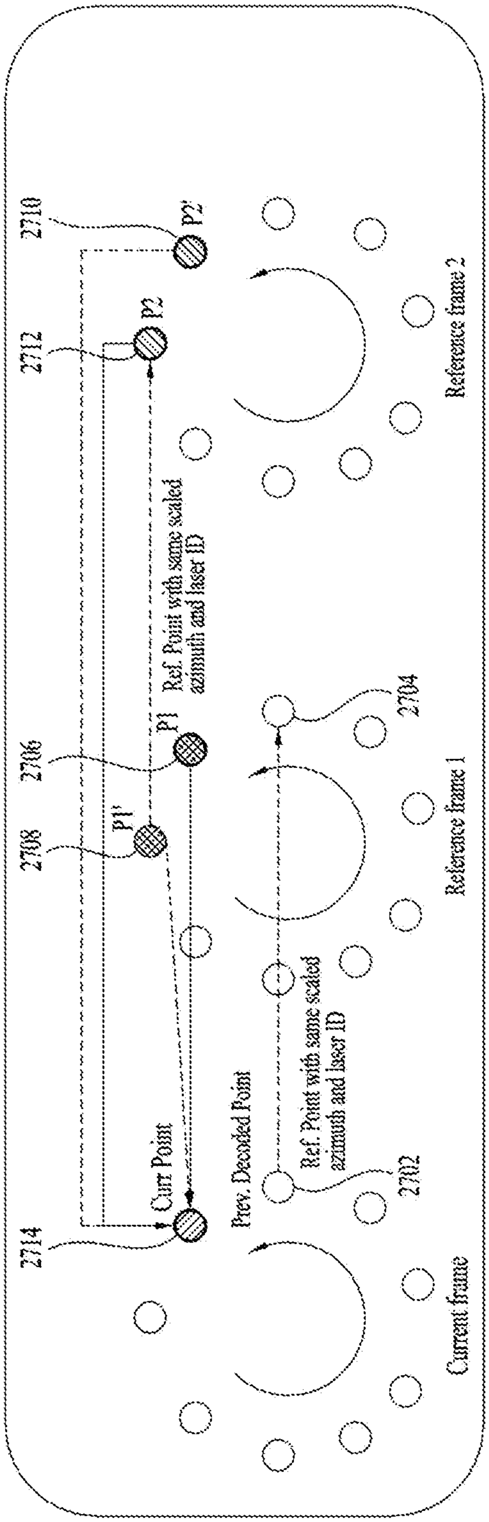
FIG. 27 illustrates backward inter prediction according to embodiments.

FIG. 27 illustrates backward inter prediction according to embodiments.

Referring to FIG. 26, among frames that are later than the current frame in display order, a reference frame that is closer to the current frame may be referred to as reference frame 1, and a reference frame that is later than the current frame and reference frame 1 in display order may be referred to as reference frame 2. Reference frame 2 is positioned after reference frame 1 in display order.

In order to predict a point (or node) 2714 that is to be predicted in the current frame, the transmission and reception devices according to embodiments may search for a point 2704 having the same laser ID and similar azimuth in reference frame 1 based on a prev. decoded point (Prev.Point) 2702, which is a point decoded before the point to be predicted in the current frame, determine the closest point among the points having a radius greater than that of the Prev.Point 2702 as a first predictor (P1) 2706, and determine the next closest point as a second predictor (P1') 2708. Then, in reference frame 2, points having laser ID and a similar azimuth to P1' 2708 and the most similar radius may be determined as P2 2712, and a point having a radius less than P2 2712 and greater than the Prev.Point 2702 may be determined as P2' 2710.

In predicting the current point (or node) 2714 of the current frame, the transmission and reception devices according to embodiments may compare the four predictors P1, P1', P2, and P2' individually or select the best candidate from among combinations of two of the predictors. In predicting the current point information by combining two or more pieces of predictor information, the predicted value may be calculated by applying an arithmetic mean, a geometric mean, a weight based on a difference in display order, or the like.

In order to predict the current point 2714 in the current frame, the transmission/reception device/method according to embodiments may find a second point 2704 having the same laser ID and similar azimuth in reference frame 1 based on the previously decoded first point 2702 in the current frame. Then, the closest point, the third point 2706, among the points having a radius greater than that of the first point 2702 in reference frame 1 may be determined as a first predictor (P1) 2706 or a first candidate point (P1) 2706, and the next closest point, the fourth point 2708, may be determined as a second predictor (P1') 2708. Then, in reference frame 2, a fifth point 2712 having the same laser ID and similar azimuth to the fourth point 2708 and the most similar radius may be determined as a third predictor (P2) 2712, and a point having a radius less than that of the fifth point 2712 and greater than that of the first point 2702 may be determined as a fourth predictor (P2') 2710.

Figure 28:
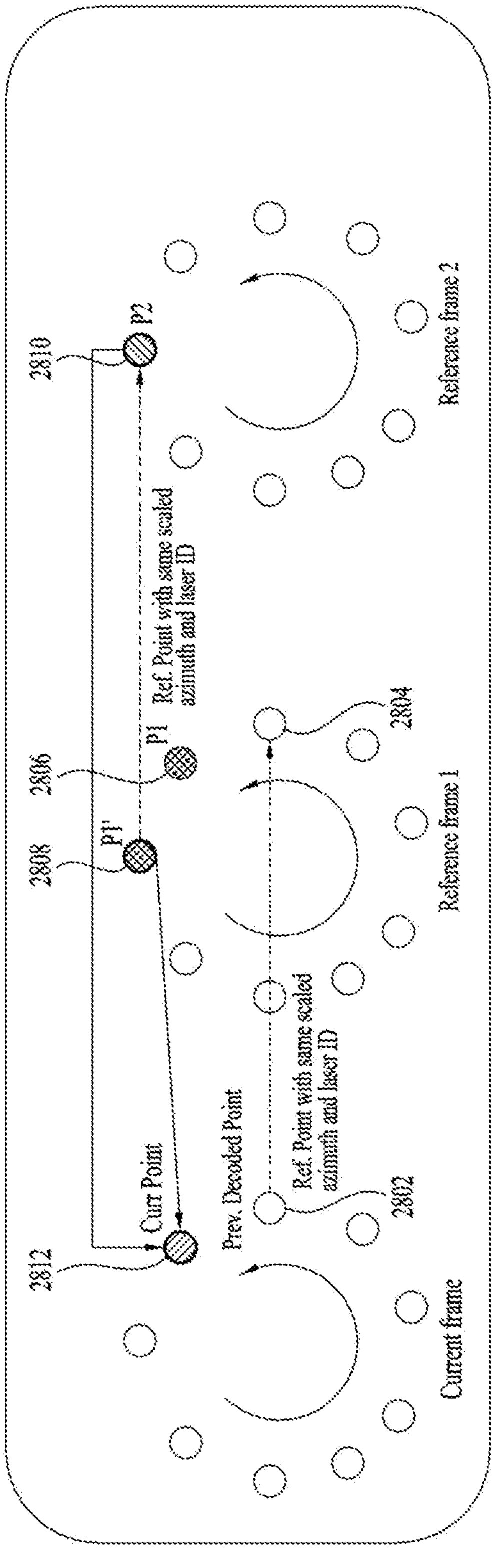
FIG. 28 illustrates backward inter prediction according to embodiments.

FIG. 28 illustrates backward inter prediction according to embodiments.

Referring to FIG. 26, among frames that are later than the current frame in display order, a reference frame that is closer to the current frame may be referred to as reference frame 1, and a reference frame that is later than the current frame and reference frame 1 in display order may be referred to as reference frame 2. Reference frame 2 is positioned after reference frame 1 in display order.

In order to predict a point (or node) 2814 that is to be predicted in the current frame, the transmission and reception devices according to embodiments may search for a point 2804 having the same laser ID and similar azimuth in reference frame 1 based on a prev. decoded point (Prev.Point) 2802, which is a point decoded before the point to be predicted in the current frame, determine the closest point among the points having a radius greater than that of the Prev.Point 2802 as a first predictor (P1) 2806, and determine the next closest point as a second predictor (P1') 2808. Then, in reference frame 2, a point having laser ID and a similar azimuth to P1' 2808 and a radius most similar to that of P1' 2808 may be determined as P2 2810.

In predicting the current point (or node) 2814 of the current frame, the transmission and reception devices according to embodiments may compare the three predictors P1, P1', and P2 individually or select the best candidate from among combinations of two of the predictors. In predicting the current point information by combining two or more pieces of predictor information, the predicted value may be calculated by applying an arithmetic mean, a geometric mean, a weight based on a difference in display order, or the like.

In order to predict the current point 2812 in the current frame, the transmission/reception device/method according to embodiments may find a second point 2804 having the same laser ID and similar azimuth in reference frame 1 based on the previously decoded first point 2802 in the current frame. Then, the closest point, the third point 2806, among the points having a radius greater than that of the first point 2802 in reference frame 1 may be determined as a first predictor (P1) 2806 or a first candidate point (P1) 2806, and the next closest point, the fourth point 2808, may be determined as a second predictor (P1') 2808. Then, in reference frame 2, a fifth point 2810 having the same laser ID and similar azimuth to the fourth point 2808 and a radius most similar to that of the fourth point 2808 may be found and determined as a third predictor P2 2810.

In some embodiments, points are compared based on the difference in radius alone when they have the same laser ID and similar azimuths. However, the azimuth or laser ID may be substituted for the comparison. Further, the points may be compared in terms of one or more of the elements laser ID, azimuth, and radius. The three referencing directions may vary on a frame-by-frame basis or on a point (or node)-by-point basis. When there is any point (or node) referencing multiple frames in the case where the directions vary on the point-by-point basis, the reference frame information may be maintained until the prediction of the frame or predictive tree to which the point belongs is completed, or the reference frame information may be deleted upon completion of the prediction of the point (or node) referencing multiple frames.

According to embodiments, the transmission and reception devices may compare points between frames based on at least one of laser ID, azimuth, and radius. For example, a reference point or predictor may be determined by comparing points in a reference frame based on at least one of the laser ID, azimuth, and radius of a point decoded prior to the current point. The transmission and reception devices according to embodiments may determine a plurality of predictors, and may predict the current point based on a combination of the plurality of predictors.

To select a best case among the found points (or predictors), the transmission and reception devices according to embodiments may exclude some points from the search if the information found is greater than a specific threshold. For example, when the difference between some or all of P1, P1', P2, and P2' according to embodiments and the current point is greater than a threshold, the corresponding points may be excluded from the best case search. The difference from the current point may be a difference in azimuth or radius, may be a Euclidean distance or other measure of distance, or may be a difference in attribute information.

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform the forward, bi-directional, or backward inter-frame prediction described with reference to FIGS. 20 to 28.

In other words, the transmission/reception device/method according to embodiments may predict the current point in the current frame by referencing points belonging to a plurality of frames positioned before or after the current frame in display order.

Further, the transmission/reception device/method according to embodiments may select predictors or candidate points to be referenced in a reference frame by comparing not only laser ID, azimuth, and radius, but also X, Y, and Z values according to the characteristics of the coordinate system.

The transmission/reception device/method according to embodiments may select, in the reference frame, predictors or candidate points based on their difference in distance from the current point according to a specific threshold. For example, when a difference in characteristic between a point and the current point is greater than a threshold, the point may not be selected as a predictor or candidate point.

According to embodiments, by predicting point cloud data with reference to a plurality of frames, the information about the current point in the current frame may be more accurately predicted. Accordingly, the difference between the predicted information and the actual information may be reduced, resulting in reduced residuals, reduced amounts of data to be transmitted and received, increased transmission and reception efficiency, and lowered encoding or decoding latency.

Figure 29:
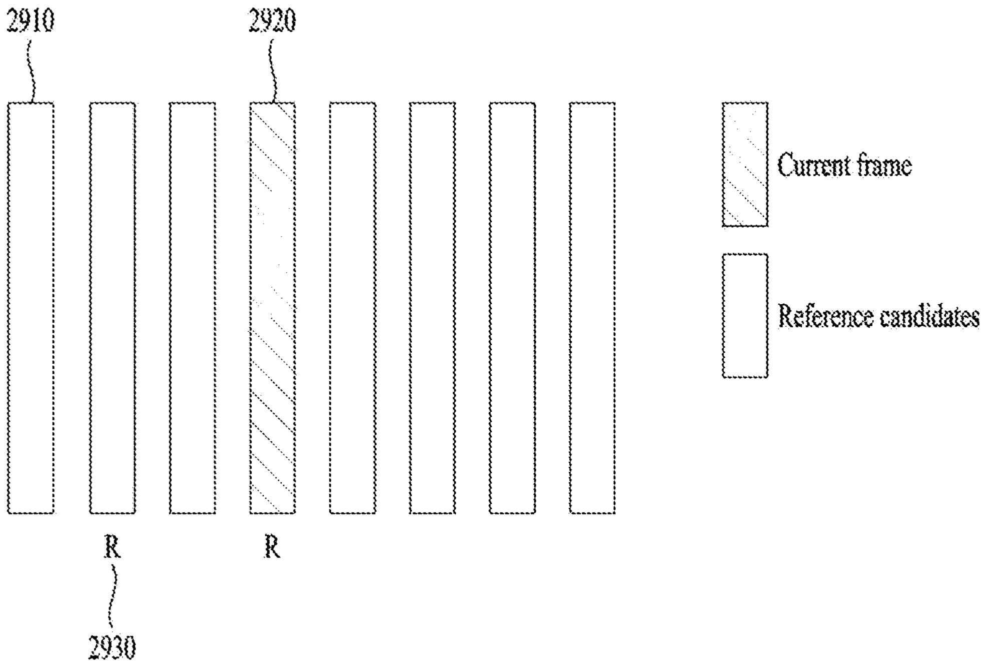
FIG. 29 illustrates a GOF according to embodiments.

FIG. 29 illustrates a GOF according to embodiments.

The transmission/reception device/method according to embodiments may perform inter-frame prediction (inter prediction) based on a cumulative reference frame. One or more reference frames may be selected to improve the accuracy of the inter-frame prediction in predicting the current node in the current frame.

Referring to FIG. 29, a scenario is shown in which two frames are selected as reference frames 2930 from among seven reference candidates 2910 to predict the current frame 2920 among the eight frames belonging to a GoF. To use the reference frames, the reference frames should be decoded prior to the current frame, and the order of decoding thereof may be signaled. Additionally, information about the display order of the reference frames or information about the sequence of the frames in the GOF may be signaled.

Figure 30:
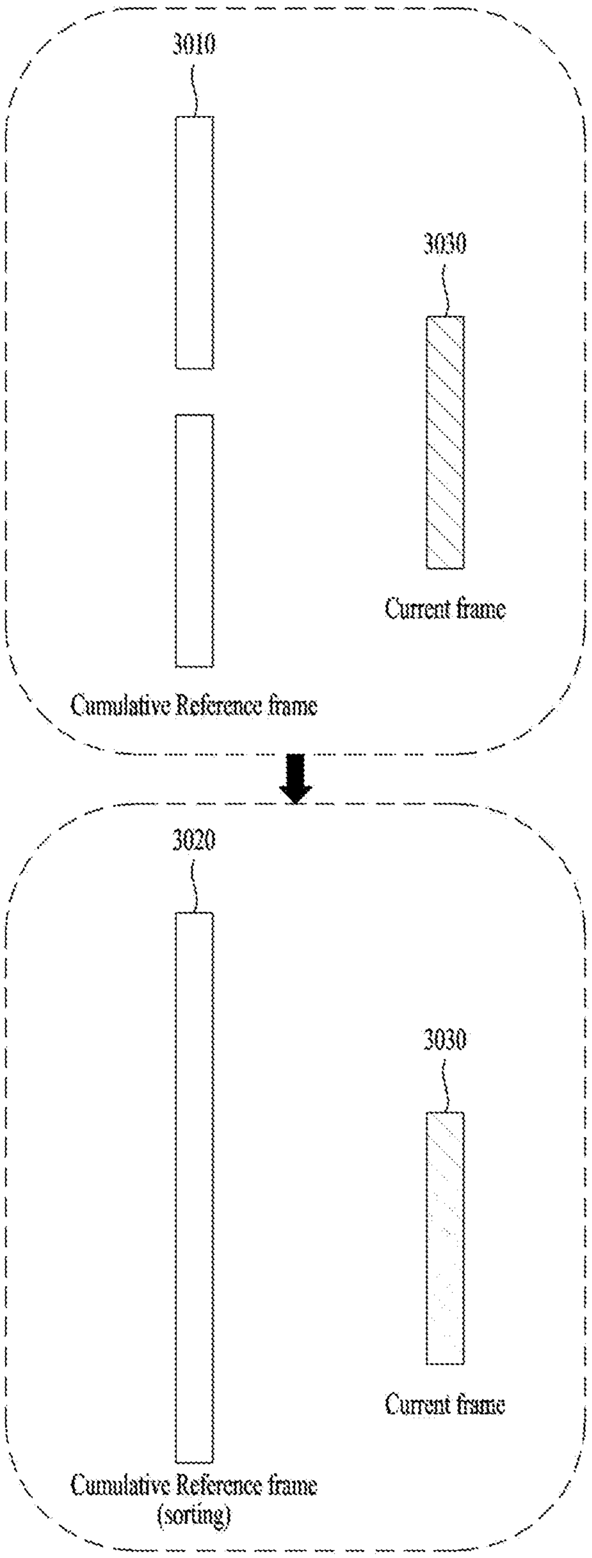
FIG. 30 illustrates a cumulative reference frame according to embodiments.

FIG. 30 illustrates a cumulative reference frame according to embodiments.

The reference frames 2930 selected in FIG. 29 may be generated as a cumulative reference frame that is generated in the form of accumulated point cloud data and then sorted for comparison with the current frame, as shown in FIG. 30.

The transmission/reception device/method according to embodiments may generate a cumulative reference frame 3010 by accumulating the selected reference frames, and may generate a sorted cumulative reference frame 3020 by sorting the points in the cumulative reference frame. The transmission/reception device/method according to embodiments may compare the current point in the current frame with points in the cumulative reference frame 3020 to select candidate points for predicting the current point.

Figure 31:
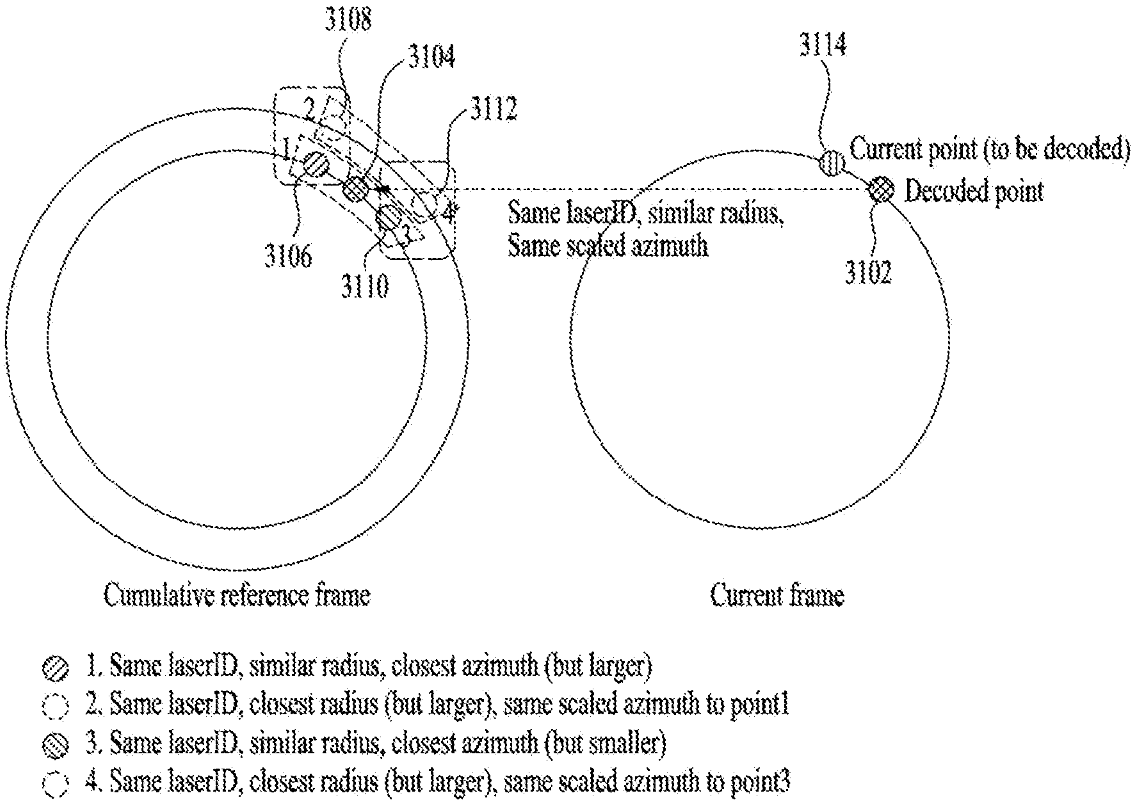
FIG. 31 illustrates a method of predicting a current point based on a cumulative reference frame according to embodiments.

FIG. 31 illustrates a method of predicting a current point based on a cumulative reference frame according to embodiments.

The transmission/reception device/method according to embodiments aggregates the selected reference frames into a single point cloud and sorts the points in the same manner as the sorting method for the current frame. After the sorting, the point cloud of the cumulative reference frame is searched for a point 3104 that has the most similar laser ID, azimuth, and radius to the decoded point 3102 immediately before the current point (or node) 3114 in the current frame, as shown in FIG. 31. In this case, one more points may be similar to the decoded point 3102, but they are considered as redundant points. Thus, the point 3106 with the larger azimuth and at the closest position to the decoded point 3102 may be selected as a candidate. 2) a point 3108 having the same laser ID, similar azimuth, and larger radius based on point 1, the point 3106, may be selected as a candidate. 3) Based on the decoded point 3102, a point 3110 with a smaller azimuth and at the closest position may be selected as a candidate. 4) A point 3112 having the same laser ID, similar azimuth, and larger radius based on point 3, the point 3110, may be selected as a candidate. Thus, the transmission/reception device/method according to embodiments may find four candidate points in total to predict the current point in the current frame.

In order to predict the current point 3114 in the current frame, the transmission/reception device/method according to embodiments may find a second point 3104 having the same laser ID and similar azimuth and radius in the cumulative reference frame based on the previously decoded first point 3102 in the current frame. Then, a third point 3106 that has a larger azimuth and is positioned closest to the first point 3102 may be selected as a candidate point in the cumulative reference frame. Further, a fourth point 3108 that has the same laser ID and a similar azimuth to the third point 3106, and a larger radius than the third point 3106 may be selected as a candidate point. Further, a fifth point 3110 that has a smaller azimuth and is at the closest position based on the first point 3102 may be selected as a candidate point. Further, a sixth point 3112 that has the same laser ID, a similar azimuth, and a larger radius based on the fifth point 3110 may be selected as a candidate point.

Methods for Selecting Predicted Values According to Embodiments

Method 1. The four selected points are used to determine whether the position of the current point 3114 is close to P1 3106, P2 3108, P3 3110, or P4 3112 in the cumulative reference frame based on azimuth. Then, a group of points is found by determining whether the position of the current point is close to P1 3106, P2 3108, P3 3110, or P4 3112 based on radius.

Since P1 3106 and P2 3108 have the same (or similar) azimuth as the current point 3114, one representative azimuth may be selected. Similarly, one representative azimuth may be selected for P3 3110 and and P4 3112. Accordingly, a group of most similar points (a larger azimuth group or smaller azimuth group based on the decoded point) may be selected by comparing the representative azimuths with the azimuth of the current point 3114. Depending on whether to use the closest one of the two points in the selected azimuth group or the average of the two points as a predicted value of the current node 3114, three modes may be signaled as described below.

The transmission/reception device/method according to embodiments may group the candidate points based on their azimuths, and select a group of similar points through comparison with the current point based on the representative azimuth. The closest point among the points in the selected point group may be used as a predicted value of the current point, or the average of the points may be used as a predicted value of the current point.

| mode | description |
|---|---|
| 0 | Similar radius to decoded point |
| 1 | Larger radius than decoded point |
| 2 | Averaged radius |

Method 2. Based on the combination of the four selected points, it may be determined whether it is advantageous to predict the position of the current point 3114 in the backward direction (corresponding to the combination of P3 and P4), in the forward direction (corresponding to the combination of P1 and P2), bi-directionally (corresponding to the combination of P1 and P3), or in a distant bi-directional direction (corresponding to the combination of P2 and P4), and then signaling corresponding to the determination may be provided.

| mode | description |
|---|---|
| 0 | Forward direction |
| 1 | Backward direction |
| 2 | Bi-direction |
| 3 | Farther bi-direction |

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform the inter-prediction based on the cumulative reference frame described with reference to FIGS. 29 to 31 and signaling related to a prediction method.

According to embodiments, by predicting point cloud data with reference to a cumulative frame, which is an accumulation of a plurality of frames, the information about the current point in the current frame may be predicted more accurately. Accordingly, the difference between the predicted information and the actual information may be reduced, resulting in reduced residuals, reduced amounts of data to be transmitted and received, increased transmission and reception efficiency, and lowered encoding or decoding latency.

Figure 32:
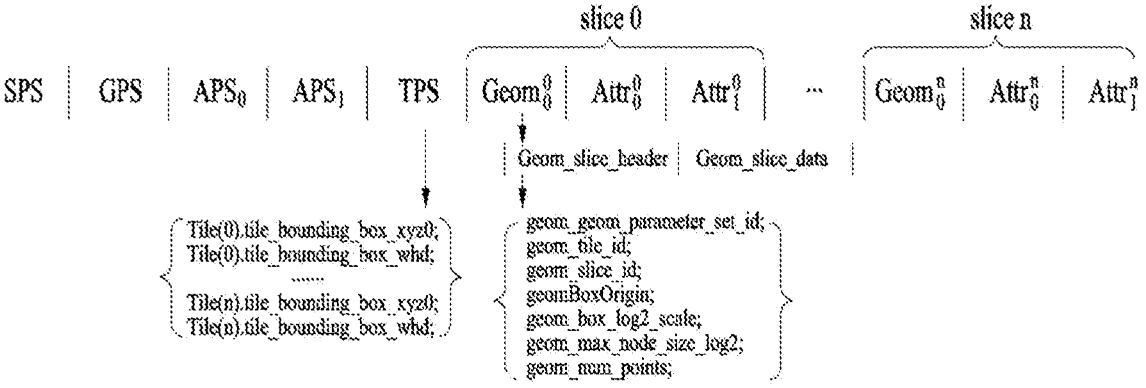
FIG. 32 illustrates an encoded bitstream according to embodiments.

FIG. 32 illustrates an encoded bitstream according to embodiments.

Bitstreams according to embodiments may be transmitted based on the transmission device 10000 of FIG. 1, the transmission method of FIG. 2, the encoder of FIG. 4, the transmission device of FIG. 12, the devices of FIG. 14, the transmission method/device of FIG. 16, and/or the transmission method/device of FIGS. 30 and 32. Further, bitstreams according to embodiments may be received based on the reception device 20000 of FIG. 1, the reception method of FIG. 2, the decoder of FIG. 11, the reception device of FIG. 13, the devices of FIG. 14, and/or the reception method/device of FIGS. 31 and 33.

Relevant information may be signaled to add/carry out embodiments. Parameters (which may be referred to as metadata, signaling information, etc.) according to embodiments may be generated in a process of a transmitter according to embodiments described below, and delivered to a receiver according to embodiments for use in a reconstruction process. For example, the parameters according to the embodiments may be generated in a metadata processor (or metadata generator) of the transmission device according to the embodiments described below and acquired by a metadata parser of the reception device according to the embodiments described below.

The transmission and reception devices according to embodiments may utilize multiple frames or a cumulative reference frame to define information for predicting a predictive geometry node. A sequence parameter set according to embodiments may indicate whether the predictive geometry node is predicted based on multiple frames or a cumulative reference frame, and may carry all or part of relevant necessary information depending on the implementation method. Also, corresponding information may be carried in a geometry parameter set, a slice header, an SEI message, a data unit header, and the like.

Furthermore, the transmission and reception devices according to embodiments may define the multi-frame prediction-related information or the cumulative frame prediction-related information in corresponding or separate positions depending on the application, system, or the like to provide different scopes and methods of application. If information containing similar functions is signaled in a higher level, it may be applicable even if signaling is omitted in a parameter set of a lower level. Additionally, when the syntax elements defined below are applicable not only to the current point cloud data stream but also to multiple point cloud data streams, the information may be carried in a higher-level parameter set or the like.

A bitstream according to embodiments may contain information about a prediction method in which multiple frames or a cumulative frame is referenced to predict point cloud data.

The transmission and reception devices according to embodiments may signal relevant information to perform the prediction based on a plurality of frames. Parameters (which may be referred to as metadata, signaling information, or the like) according to embodiments may be generated in a process of the transmission device according to embodiments described below and may be delivered to the reception device according to the embodiments for use in a process of reconstructing point cloud data. For example, parameters may be generated by the metadata processor (or metadata generator) 12007 of FIG. 12 and acquired by the metadata parser 13006 of FIG. 13.

FIG. 32 illustrates a configuration of an encoded point cloud.

The abbreviations shown in FIG. 32 indicate the following

SPS: Sequence Parameter Set

GPS: Geometry Parameter Set

APS: Attribute Parameter Set

TPS: Tile Parameter Set

Geom: Geometry bitstream=geometry slice header+geometry slice data

Attr: Attribute bitstream=attribute slice header+attribute slice data

A slice according to embodiments may be referred to as a data unit. The slice header may be referred to as a data unit header. In addition, slices may be referred to by other terms with similar meanings such as bricks, boxes, and regions.

The bitstream according to embodiments may provide tiles or slices to allow the point cloud to be divided into regions for processing. When the point cloud is divided into regions, each region may have a different importance. The transmission and reception devices according to embodiments may provide different filters or different filter units to be applied based on the importance, thereby providing a method to use a more complex filtering method with higher quality results for important regions. In addition, by allowing different filtering to be applied to each region (region divided into tiles or slices) depending on the processing capacity of the reception device, instead of using a complicated filtering method for the entire point cloud, better image quality may be ensured for regions that are important to the user and appropriate latency may be ensured for the system. When the point cloud is divided into tiles, different filters or different filter units may be applied to the respective tiles. When the point cloud is divided into slices, different filters or different filter units may be applied to the respective slices.

FIG. 33 shows an exemplary syntax of a sequence parameter set (seqparameter_set) according to embodiments.

In the bitstream according to embodiments, information about point (or node) prediction based on multiple reference frames may be contained in the sequence parameter set (SPS). That is, information about prediction based on multiple reference frames may be signaled through the SPS.

sps_interEnable: A flag indicating whether a sequence allows for inter-prediction. If the value is True, it may indicate that some frames in the sequence allow for inter-prediction (or inter-frame prediction); if the value is False, it may indicate that only intra-prediction (or intra-frame prediction) is allowed for all frames in the sequence.

numGroupOfFrame: When sps_interEnable is True, numGroupOfFrame indicates the periodicity of random access points corresponding to an inter-predicted frame. For example, numGroupOfFrame equal to 8 indicates that the first frame is predicted using intra-prediction, and that the 7 subsequent frames are predicted using inter-prediction. A frame subsequent to the eighth frame may be intra-predicted again. The value may vary from sequence to sequence.

multiFrameEnableFlag: Indicates whether the sequence allows prediction through multiple reference frames when inter prediction is allowed. When the value is True, it indicates that a portion of the frame corresponding to the inter-prediction is predicted based on multiple reference frames. When the value is False, it indicates that the prediction is performed based on a single frame.

CodingOrder[numGroupOfFrame]: When multiFrameEnableFlag is True, CodingOrder[numGroupOfFrame] may signal the coding order in inter-prediction on a per GOF basis because the display order of frames may be different from the order of frames to be referenced. CodingOrder may be declared in the SPS and applied to any sequence. If CodingOrder is omitted, the order may be signaled on a frame-by-frame basis.

FIG. 34 shows an exemplary syntax of a geometry parameter set (geometry_parameter_set) according to embodiments.

In the bitstream according to embodiments, information about point (or node) prediction based on multiple reference frames may be contained in the geometry parameter set (GPS). That is, information about prediction based on multiple reference frames may be signaled through the GPS.

gps_interEnable: A flag indicating whether a frame allows for inter-prediction. If the value is True, it indicates that some frames in the sequence allow for inter-prediction; if the value is False, it indicates that only intra-prediction is allowed for all frames in the sequence.

gps_multiFrameEnableFlag: Indicates whether prediction is performed based on one or more reference frames when it is an inter-prediction frame (when gps_interEnable is True).

gps_nextDisplayIndex: Indicates the display index or frame index of a frame to be coded after the frame. This may be inherited by being matched with the coding order in the SPS. It may be calculated as the difference between the frame index and the coding order, i.e. the residual, or used as a substitute when the coding order is omitted in the SPS. gps_nextDisplayIndex may be signaled as the difference in position of the frame from the index or display index of the current frame, or it may be the difference in position from the current frame on a per GoF basis or may be an index assigned in the GoF level.

gps_numRefFrame: May indicate the number of frames referenced when predicting the current frame.

gps_refindex[numRefFrame]: May indicate the index of a frame to be referenced when predicting the current frame. The index may be a difference in display index from the current frame, or may indicate a difference in position in a GoF level, or may signal the sequence of the frame that is referenced among other frames.

FIG. 35 shows an exemplary syntax of an attribute parameter set (attributeparameter_set) according to embodiments.

In the bitstream according to embodiments, information about point (or node) prediction based on multiple reference frames may be contained in the attribute parameter set (APS). That is, information about prediction based on multiple reference frames may be signaled through the APS.

aps_interEnable: A flag indicating whether a frame allows for inter-prediction. If the value is True, it indicates that some frames in the sequence allow for inter-prediction; if the value is False, it indicates that only intra-prediction is allowed for all frames in the sequence. aps_interEnable may inherit information from gps_interEnable, or may be managed separately.

aps_multiFrameEnableFlag: Indicates whether the frame is predicted based on one or more reference frames when it is an inter-prediction frame (when aps_interEnable is True). aps_multiFrameEnableFlag may be inherited from the GPS, or may be managed and signaled as separate information.

aps_nextDisplayIndex: Indicates the display index or frame index of a frame to be coded after the frame. This may be inherited by being matched with the coding order in the SPS. It may be calculated as the difference between the frame index and the coding order, i.e. the residual, or used as a substitute when the coding order is omitted in the SPS. aps_nextDisplayIndex may be signaled as the difference in position of the frame from the index or display index of the current frame, or it may be the difference in position from the current frame on a per GoF basis or may be an index assigned in the GoF level. Alternatively, information used in gps_nextDisplayIndex may be inherited and used.

aps_numRefFrame: May indicate the number of frames referenced when predicting attribute information about the current frame. This information may be the same as that ni gps_numRefFrames in the GPS, and may be managed separately.

aps_refIndex[numRefFrame]: May indicate the index of a frame to be referenced when predicting attribute information about the current frame. The index may be a difference in display index from the current frame, or may indicate a difference in position in a GoF level, or may signal the sequence of the frame that is referenced among other frames. This information may be the same as that in gps_refIndex [numRefFrame] in the GPS, and may be managed separately.

To apply embodiments, each point (or node) in the predictive geometry may signal the following information.

The transmission/reception device/method according to embodiments may apply a none mode, a singlePoint mode, a multiPoint mode, or a MultiPointAverage mode as a mode for predicting the current point for each node. The None mode indicates that the four modes used in traditional intra prediction will be used. The SinglePoint mode is a mode for determining one of the points as a predicted value rather than separately processing the point candidate found in the reference frame. The multiPoint mode is a mode for determining the predicted value based on a combination of points found in the reference frame, such as the average, weighted average, or geometric mean of the points. The MultiPointAverage mode may indicate a mode of prediction based on a combination of all points or a combination of some of the points.

Before applying each mode, the transmission/reception device/method according to embodiments may exclude points found in the reference frames from the candidate points to be used to predict the current point when the distance between the points and the current point is greater than a predetermined threshold. If the number of point candidates remaining after excluding points that exceed the threshold is less than or equal to 1, the prediction method may be determined by considering only the none or singlePoint mode in the inter-prediction structure described below. Also, if the number of remaining point candidates is less than or equal to 2, the calculation may be performed only for the singlePoint mode and multiPoint mode, excluding the MultiPointAverage mode and none mode in the inter-prediction structure below. Also, if all point candidates are included, the best case may be found between the multiPoint mode and MultiPointAverage mode except for the None mode and signaled.

Each prediction mode includes four sub-modes, and up to 12 modes may be calculated per node (or point). The residuals between the predicted values for at least eight sub-modes and the current point may be found and the mode with the smallest residual may be signaled. Then, the decoder may receive the signaled information and perform reconstruction based on the received information.

FIGS. 36 to 38 illustrate a process of a method of predicting a current point according to embodiments.

FIGS. 36 to 38 illustrate the internal process used to predict the current node using the single point mode when predictive geometry is used by the transmission/reception device/method according to embodiments. When multiple frames are used to predict the current point and there are four candidate points to be used in the prediction, each case represents a candidate point. When the points replace the current node, predMode may be returned for the point with the smallest residual, pred may be returned as the point information in this case, and minResidual may be returned for the residual when applying the mode. Thus, they may be entropy-encoded by the transmitter and decoded by the receiver to be used for prediction.

In order to predict the current point, the transmission/reception device/method according to embodiments may independently compare each of the selected candidate points in the reference frame with the current point, and predict the current point with the candidate point with the smallest difference from the current point.

FIG. 39 illustrates a method of predicting a current point according to embodiments.

FIG. 39 illustrates the internal process used to predict the current node using the multi point mode when predictive geometry is used by the transmission/reception device/method according to embodiments. When multiple frames are used to predict the current point and there are four candidate points to be used in the prediction, each case represents a combination or average of candidate points. When the value given when the corresponding mode is applied replaces the current node, predMode may be returned for the point with the smallest residual, pred may be returned as the point information in this case, and minResidual may be returned for the residual when applying the mode. Thus, they may be entropy-encoded by the transmitter and decoded by the receiver to be used for prediction.

The transmission/reception device/method according to embodiments may compare a value calculated based on a combination of candidate points selected in the reference frame to predict the current point with the current point, and may use the value with the smallest difference to predict the current point. Information about the candidate points and the mode information, residual information, etc. for combining the candidate points may be signaled and used to predict the current point.

FIG. 40 illustrates a method of predicting a current point according to embodiments.

FIG. 40 illustrates the internal process used to predict the current node based on the average of multiple points when predictive geometry is used by the transmission/reception device/method according to embodiments. When multiple frames are used to predict the current point and there are four candidate points to be used in the prediction, each case may represent a combination or average of candidate points. Cases 2 and 4 are the average or geometric mean calculated for the remaining points except for the farthest point among the four points. When the current node is replaced by one of the predicted values in the respective cases, predMode may be returned for the point with the smallest residual, pred may be returned as the point information in this case, and minResidual may be returned for the residual when applying the mode. Thus, they may be entropy-encoded by the transmitter and decoded by the receiver to be used for prediction.

The transmission/reception device/method according to embodiments may compare a value calculated based on a combination of candidate points selected in the reference frame to predict the current point with the current point, and may use the value with the smallest difference to predict the current point. Information about the candidate points and the mode information, residual information, etc. for combining the candidate points may be signaled and used to predict the current point.

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform inter-prediction based on the reference frames described with reference to FIGS. 33 to 39 and signaling related to a prediction method.

FIG. 41 shows an exemplary syntax of a sequence parameter set (seq_parameter_set).

Node (or, point) prediction information utilizing a cumulative reference frame may be added to and signaled in the SPS.

sps_interEnable: A flag indicating whether a sequence allows for inter-prediction. If the value is True, it may indicate that some frames in the sequence allow for inter-prediction; if the value is False, it may indicate that only intra-prediction is allowed for all frames in the sequence.

numGroupOfFrame: When sps_interEnable is True, numGroupOfFrame may indicate the periodicity of random access points corresponding to an intra-predicted frame. For example, when numGroupOfFrame is equal to 8, the first frame is predicted using intra-prediction, and inter-prediction is used for the 7 subsequent frames. Then, intra-prediction may be performed again for the next frame. The value may vary from sequence to sequence.

cumulFrameEnableFlag: May indicate whether the sequence should cumulatively use reference frames for inter-prediction when inter-prediction is allowed.

FIG. 42 shows an exemplary syntax of a geometry parameter set (geometry_parameter_set) according to embodiments.

Node (or, point) prediction information utilizing a cumulative reference frame may be added to and signaled in the GPS.

gps_interEnable: A flag indicating whether a frame allows for inter-prediction. If the value is True, it may indicate that some frames in the sequence allow for inter-prediction; if the value is False, it may indicate that only intra-prediction is allowed for all frames in the sequence.

gps_cumulFrameEnableFlag: Indicates whether prediction is performed based on a cumulative reference frame when it is an inter-prediction frame (when gps_interEnable is True).

gps_numRefFrame: May indicate the number of frames included in the cumulative reference frame when predicting the current frame.

RefIndex[numRefFrame]: May indicate the index of a frame needed to create the cumulative reference frame in predicting the current frame. The index may be a difference in display index from the current frame, or may indicate a difference in position in a GoF level, or indicate the sequence of the frame that is referenced among other frames.

predictionDirection: May indicate the direction of information to be selected using the mode information below among the candidate points selected to predict each node in the current frame after creating the cumulative reference frame.

| mode | description |
|---|---|
| 0 | Forward direction |
| 1 | Backward direction |
| 2 | Bi-direction |
| 3 | Farther bi-direction |

FIG. 43 shows an exemplary of an attribute parameter set (attribute_parameter_set) according to embodiments.

Node (or, point) prediction information utilizing a cumulative reference frame may be added to and signaled in the APS.

aps_interEnable: A flag indicating whether a frame allows for inter-prediction. If the value is True, it may indicate that some frames in the sequence allow for inter-prediction; if the value is False, it may indicate that only intra-prediction is allowed for all frames in the sequence. aps_interEnable may inherit information from gps_interEnable, or may be managed separately.

aps_cumulFrameEnableFlag: Indicates whether prediction is performed based on a cumulative reference frame in predicting point cloud attribute information when the frame is an inter-prediction frame (when aps_interEnable is True).

aps_numRefFrame: Indicates the number of frames included in the cumulative reference frame when predicting the current frame.

RefIndex[numRefFrame]: May indicate the index of a frame needed to create the cumulative reference frame in predicting the current frame. The index may be a difference in display index from the current frame, or may indicate a difference in position in a GoF level, or indicate the sequence of the frame that is referenced among other frames. This information may be inherited from GPS, or may be managed as a separate index.

predictionDirection: May indicate the direction of information to be selected using the mode information below among the candidate points selected to predict each node in the current frame after creating the cumulative reference frame. This information may be inherited from the GPS, or may be managed as a separate index.

FIG. 44 is a flowchart illustrating a device/method for transmitting point cloud data according to embodiments.

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform inter-prediction based on a plurality of reference frames and signaling related to a prediction method.

FIG. 44 may be understood as a flow chart illustrating a process of processing point cloud data, and a point cloud data transmission/reception device/method in terms of the components that perform each step in the processing process.

Once point cloud data is input, the transmission device/method according to embodiments may cluster and sort the data to facilitate compression using predictive geometry (4410).

After the processing, it is determined whether to perform intra-prediction for the point cloud data (4421), and a geometry intra-prediction may be performed in the case of an intra-prediction frame (4426). When the prediction is not the intra-prediction, it is determined whether only one reference frame or multiple reference frames are referenced for inter-prediction (4422). When a single reference frame is used for prediction, the closest point to a point processed prior to the current point may be found within the single reference frame based on internal criteria (4423). In the case where multiple reference frames are used to perform prediction, the closest point to the current point is found in each reference frame according to an internal process based on a point processed prior to the current point (4424). Inter-prediction may be performed based on point candidate to be used for the prediction (4425), and the points for which the intra-prediction and inter-prediction are completed may be input to a reference frame buffer in coding order for use in the prediction of the next frame. Once the prediction mode is determined for all nodes, the residuals, reference frame information, and the like that may be generated when the prediction mode is applied may be entropy-coded to generate an output bitstream.

The component blocks illustrated in FIG. 44 may include a processor configured to perform operations for processing point cloud data and instructions to operate the processor, and may be referred to as units, processors, modules, or the like. FIG. 44 may represent a processing device including a combination of components, such as a processor or module, for processing point cloud data, or may represent a data processing method illustrating data processing operations performed by the respective components.

Referring to FIG. 44, a point cloud data transmission/reception device/method according to the embodiments may cluster or sort the point cloud data (4410) and determine whether to perform intra-prediction (4421). If the prediction is not intra-prediction, the transmission/reception device/method may determine whether a plurality of frames is referenced (4422). When a plurality of frames is referenced, candidate points closest to the current point may be searched for based on the plurality of frames (4424), and the current point may be predicted according to the prediction mode using the candidate points (4425).

FIG. 45 is a flowchart illustrating a device/method for receiving point cloud data according to embodiments.

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform inter-prediction based on a plurality of reference frames and signaling related to a prediction method.

FIG. 45 may be understood as a flow chart illustrating a process of processing point cloud data, and a point cloud data transmission/reception device/method in terms of the components that perform each step in the processing process.

The reception device/method according to embodiments may perform entropy decoding on the received bitstream (4510). When the frame is for intra-prediction, it may apply a conventional intra-prediction method (4526), and then update the geometry information related to the point cloud data. When the prediction is not the intra-prediction, it is determined whether the prediction is performed based on a single reference frame (4522). When a single frame is referenced, the closest point is found in the reference frame based on a predetermined criterion according to the prediction mode and reference frame information (4523), the current node is predicted according to the prediction mode received from the transmission device according to embodiments, and the predicted value and a residual are added and input to the current node. The operation is repeated until all nodes up to the leaf node of the tree of the predictive geometry are reconstructed. When multiple frames are referenced, the prediction mode and reference frames may be retrieved from the reference frame buffer, and the closest point may be found in the reference frames based on a predetermined criterion (4524). Then, prediction is performed according to the prediction mode received from the transmission device according to embodiments, and the predicted value and a residual are added and input to the current node. Then, when the point is reconstructed after the prediction for all nodes is completed according to the prediction mode, the reconstructed point may be sent to an attribute prediction module so as to be used for prediction of attribute information.

The component blocks illustrated in FIG. 45 may include a processor configured to perform operations for processing point cloud data and instructions to operate the processor, and may be referred to as units, processors, modules, or the like. FIG. 45 may represent a processing device including a combination of components, such as a processor or module, for processing point cloud data, or may represent a data processing method illustrating data processing operations performed by the respective components.

Referring to FIG. 45, a point cloud data transmission/reception device/method according to the embodiments may decode the point cloud data (4510) and determine whether to perform intra-prediction (4521). If the prediction is not intra-prediction, the transmission/reception device/method may determine whether a plurality of frames is referenced (4522). When a plurality of frames is referenced, candidate points closest to the current point may be searched for based on the plurality of frames (4524), and the current point may be predicted according to the prediction mode based on the candidate points (4525).

FIG. 46 is a flowchart illustrating a device/method for transmitting point cloud data according to embodiments.

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform inter-prediction based on a plurality of reference frames or a cumulative reference frame and signaling related to a prediction method.

FIG. 46 may be understood as a flow chart illustrating a process of processing point cloud data, and a point cloud data transmission/reception device/method in terms of the components that perform each step in the processing process.

Once point cloud data is input, the transmission/reception device/method according to embodiments may cluster and sort the data to facilitate compression using predictive geometry (4610). After the processing, it is determined whether to perform intra-prediction for the point cloud data (4621), and a geometry intra-prediction may be performed in the case of an intra-prediction frame (4626). When the prediction is not the intra-prediction, it is determined whether to accumulate reference frames for inter-prediction (4622). When only one reference frame is used for prediction, the closest point to a point processed prior to the current point may be found within the single reference frame based on internal criteria (4623). In the case where a cumulative reference frame is used to perform prediction, information about the frames to be referenced is specified, and the specified reference frames are accumulated into one point cloud and then sorted (4623). Based on a point processed prior to the current point, the closest point to the current point is found in the cumulative reference frame according to an internal process. Based on the closest point, the two closest points on both sides in the direction of the azimuth are found. Based on the two points found, the closest point is found among points with a larger radius to find candidate points to be used to predict the current node. From the candidate points, the best point group or prediction direction to predict the current node is selected, and inter-prediction is performed (4625). The points for which the intra-prediction and inter-prediction are completed are input to the reference frame buffer in coding order for use in the prediction of the next frame. Once the prediction mode is determined for all nodes, the residuals, reference frame information, and the like that may be generated when the prediction mode is applied may be entropy-coded to generate an output bitstream.

The component blocks illustrated in FIG. 46 may include a processor configured to perform operations for processing point cloud data and instructions to operate the processor, and may be referred to as units, processors, modules, or the like. FIG. 46 may represent a processing device including a combination of components, such as a processor or module, for processing point cloud data, or may represent a data processing method illustrating data processing operations performed by the respective components.

Referring to FIG. 46, a point cloud data transmission/reception device/method according to the embodiments may cluster or sort the point cloud data (4610) and determine whether to perform intra-prediction (4621). If the prediction is not intra-prediction, the transmission/reception device/method may determine whether a cumulative reference frame is used (4622). When the cumulative reference frame is referenced, the cumulative reference frame may be created based on a plurality of frames and points may be sorted (4624). Then, candidate points closest to the current point searched for in the cumulative reference frame and the current point may be predicted according to the prediction mode using the points (or predictors) (4625).

According to embodiments, by predicting point cloud data with reference to a plurality of frames, the information about the current point in the current frame may be predicted more accurately. Accordingly, the difference between the predicted information and the actual information may be reduced, resulting in reduced residuals, reduced amounts of data to be transmitted and received, increased transmission and reception efficiency, and lowered encoding or decoding latency.

FIG. 47 is a flowchart illustrating a device/method for receiving point cloud data according to embodiments.

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform inter-prediction based on a plurality of reference frames or a cumulative reference frame and signaling related to a prediction method.

FIG. 47 may be understood as a flow chart illustrating a process of processing point cloud data, and a point cloud data transmission/reception device/method in terms of the components that perform each step in the processing process.

The transmission/reception device/method according to embodiments may perform entropy decoding on the received bitstream (4710). When the frame is for intra-prediction, it may apply a conventional intra-prediction method, and may then update the geometry information related to the point cloud, or determine whether the prediction is performed based on a single reference frame (4722). When a single frame is referenced, the closest point is found in the reference frame based on a predetermined criterion according to the prediction mode and reference frame information (4723), the current node is predicted according to the prediction mode received from the transmission device according to embodiments, and a residual is added and input to the current node. The operation is repeated until all nodes up to the leaf node of the tree of the predictive geometry are reconstructed. When prediction is performed based on the cumulative reference frame (4722), the prediction mode and reference frames may be retrieved from the reference frame buffer, and the cumulative reference frame may be generated from the reference frames. Then, the closest point may be found in the reference frames based on a predetermined criterion (4724). Then, prediction is performed according to the prediction mode received from the transmission device according to embodiments. The predicted value and a residual received from the transmitter are added and input to the current node. Then, when the point is reconstructed after the prediction for all nodes is completed according to the prediction mode, the reconstructed point may be sent to an attribute prediction module so as to be used for prediction of attribute information.

The component blocks illustrated in FIG. 47 may include a processor configured to perform operations for processing point cloud data and instructions to operate the processor, and may be referred to as units, processors, modules, or the like. FIG. 47 may represent a processing device including a combination of components, such as a processor or module, for processing point cloud data, or may represent a data processing method illustrating data processing operations performed by the respective components.

Referring to FIG. 47, a point cloud data transmission/reception device/method according to the embodiments may decode the point cloud data (4710) and determine whether to perform intra-prediction (4571). If the prediction is not intra-prediction, the transmission/reception device/method may determine whether a cumulative reference frame is used (4722). When the cumulative a reference frame is used, the cumulative reference frame is generated based on a plurality of frames, and candidate points closest to the current point may be searched for in the cumulative reference frame (4724). Then, the current point may be predicted according to the prediction mode based on the found candidate points (4725).

FIG. 48 is a flowchart illustrating a method of transmitting point cloud data according to embodiments.

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform inter-prediction based on a plurality of reference frames or a cumulative reference frame and signaling related to a prediction method.

The transmission method according to the embodiments includes operation S4800 of encoding point cloud data and operation S4810 of transmitting a bitstream containing the point cloud data.

As described with reference to FIG. 15, the point cloud data may include a plurality of frames.

Operation S4800 of encoding the point cloud data may include predicting a first point belonging to a first frame. The first frame may represent the current frame and the first point may represent the current point. In other words, in the transmission method according to the embodiments, operation S4800 of encoding the point cloud data may include predicting the current point belonging to the current frame. In this case, the predicting may include predicting the current point based on points belonging to one or more of the frames.

Methods for predicting the current point belonging to the current frame is described with reference to FIGS. 20 to 28 and FIGS. 30 and 31.

The one or more frames referenced to predict the current point may be before or after the current frame. Further, one of the one or more frames may be before the current frame and the other frame may be after the current frame. Forward prediction, backward prediction, or bi-directional prediction may be performed depending on the order of the one or more frames referenced by the current frame. The order may be a display order or a coding order.

FIGS. 20 to 28 illustrate forward prediction, backward prediction, or bi-directional prediction.

Referring to FIGS. 20 to 28, the predicting includes searching for a third point belonging to one of the one or more frames based on a second point processed prior to the current point in the current frame. Here, the second point may represent a point decoded prior to the current point, and the third point may represent a point similar to the second point. Based on a laser ID, an azimuth, or a radius, it may be determined whether the third point is similar to the second point. In other words, the third point may be a point whose laser ID is the same as the second point and whose azimuth or radius is closest to that of the second point.

Further, the predicting may include selecting a plurality of candidate points based on the second point or the third point, the candidate points being used for prediction of the current point. The candidate points may be referred to as predictors, point candidates, or the like, and may represent points that are used to calculate a predicted value of the current point. The candidate points may be selected based on the laser ID, azimuth, or radius. The current point may be predicted based on the value of one of the candidate points or the value of a combination of multiple candidate points. The candidate points may be combined in various ways, such as by averaging or weighting. In other words, the current point may be predicted based on at least two candidate points.

For example, the one or more frames may include a second frame and a third frame. In the predicting, a fourth point found through a search based on the second point or the third point in the second frame may be determined as a first candidate point, and a fifth point found through a search based on the fourth point in the third frame may be determined as a second candidate point. Then, the current point is predicted based on the first candidate point and the second candidate point. In this case, the first point (current point) to the fifth point contain at least one of identification information (laser ID), azimuth information, or radius information.

In processing the point cloud data, the bitstream may contain information indicating whether the prediction is performed based on a plurality of frames, and may contain information configured to identify the one or more frames referenced to predict the current point. Thus, the reception device/method according to the embodiments may reconstruct the current point based on the information indicating whether multi-frame based prediction is performed and the identification information about the referenced frames.

Signaling information contained in the bitstream according to the embodiments is described with reference to FIGS. 32 to 35 and FIGS. 41 to 43.

The transmission method according to the embodiments may be carried out by the components of the transmission device/method illustrated in FIGS. 44 and 46. The prediction part 4420 in FIG. 44 or the prediction part 4620 in FIG. 46 may perform multi-frame based prediction according to embodiments. They may be referred to as prediction units, prediction modules, prediction processors, or the like, and may be connected or combined with other drawings illustrating the transmission device/method according to the embodiments.

A transmission device according to embodiments may include an encoder configured to encode point cloud data including a plurality of frames and a transmitter configured to transmit a bitstream containing the point cloud data. The transmission device according to the embodiments may be represented by device including components such as a unit, module, or processor that performs the processing process of the aforementioned transmission method.

FIG. 49 is a flowchart illustrating a method of receiving point cloud data according to embodiments.

The transmission/reception device/method according to the embodiments may correspond to or be combined with the transmission/reception device of FIG. 1, the transmission/reception device of FIG. 2, the point cloud encoder of FIG. 4, the point cloud decoder of FIGS. 10 and 11, the transmission device of FIG. 12, the reception device of FIG. 13, the devices of FIG. 14, and the transmission device/method of FIG. 44, the reception device/method of FIG. 45, the transmission device/method of FIG. 46, the reception device/method of FIG. 47, the transmission method of FIG. 48, or the reception method of FIG. 49. The transmission/reception device/method according to the embodiments may perform inter-prediction based on a plurality of reference frames or a cumulative reference frame and signaling related to a prediction method.

The reception method according to the embodiments includes operation S4900 of receiving a bitstream containing point cloud data and operation S4910 of decoding the point cloud data.

As described with reference to FIG. 15, the point cloud data may include a plurality of frames.

Operation S4910 of decoding the point cloud data may include predicting a first point belonging to a first frame. The first frame may represent the current frame and the first point may represent the current point. In other words, in the reception method according to the embodiments, operation S4910 of decoding the point cloud data may include predicting the current point belonging to the current frame. In this case, the predicting may include predicting the current point based on points belonging to one or more of the frames.

Methods for predicting the current point belonging to the current frame is described with reference to FIGS. 20 to 28 and FIGS. 30 and 31.

The one or more frames referenced to predict the current point may be before or after the current frame. Further, one of the one or more frames may be before the current frame and the other frame may be after the current frame. Forward prediction, backward prediction, or bi-directional prediction may be performed depending on the order of the one or more frames referenced by the current frame. The order may be a display order or a coding order.

FIGS. 20 to 28 illustrate forward prediction, backward prediction, or bi-directional prediction.

Referring to FIGS. 20 to 28, the predicting includes searching for a third point belonging to one of the one or more frames based on a second point processed prior to the current point in the current frame. Here, the second point may represent a point decoded prior to the current point, and the third point may represent a point similar to the second point. Based on a laser ID, an azimuth, or a radius, it may be determined whether the third point is similar to the second point. In other words, the third point may be a point whose laser ID is the same as the second point and whose azimuth or radius is closest to that of the second point.

Further, the predicting may include selecting a plurality of candidate points based on the second point or the third point, the candidate points being used for prediction of the current point. The candidate points may be referred to as predictors, point candidates, or the like, and may represent points that are used to calculate a predicted value of the current point. The candidate points may be selected based on the laser ID, azimuth, or radius. The current point may be predicted based on the value of one of the candidate points or the value of a combination of multiple candidate points. The candidate points may be combined in various ways, such as by averaging or weighting. In other words, the current point may be predicted based on at least two candidate points.

For example, the one or more frames may include a second frame and a third frame. In the predicting, a fourth point found through a search based on the second point or the third point in the second frame may be determined as a first candidate point, and a fifth point found through a search based on the fourth point in the third frame may be determined as a second candidate point. Then, the current point is predicted based on the first candidate point and the second candidate point. In this case, the first point (current point) to the fifth point contain at least one of identification information (laser ID), azimuth information, or radius information.

In processing the point cloud data, the bitstream may contain information indicating whether the prediction is performed based on a plurality of frames, and may contain information configured to identify the one or more frames referenced to predict the current point. Thus, the reception device/method according to the embodiments may reconstruct the current point based on the information indicating whether multi-frame based prediction is performed and the identification information about the referenced frames.

Signaling information contained in the bitstream according to the embodiments is described with reference to FIGS. 32 to 35 and FIGS. 41 to 43.

The reception method according to the embodiments may be carried out by the components of the reception device/method illustrated in FIGS. 45 and 47. The prediction part 4520 in FIG. 45 or the prediction part 4620 in FIG. 47 may perform multi-frame based prediction according to embodiments. They may be referred to as prediction units, prediction modules, prediction processors, or the like, and may be connected or combined with other drawings illustrating the reception device/method according to the embodiments.

A reception device according to embodiments may include a receiver configured to receive point cloud data including a plurality of frames and a decoder configured to decode a bitstream containing the point cloud data. The reception device according to the embodiments may be represented by device including components such as a unit, module, or processor that performs the processing process of the aforementioned reception method.

The transmission/reception device/method according to embodiments proposes a method for considering a plurality of reference frames for inter-frame motion prediction in a predictive geometry approach for point cloud content. By using multiple frames, the accuracy of the prediction may be improved. In addition, by predicting nodes from the pre-predicted frames, the encoding time required in the tree generation process may be reduced.

The present disclosure has proposed a method for considering a cumulative reference frame for inter-frame motion in a predictive geometry approach for point cloud content. By using multiple frames, the accuracy of the prediction may be improved. In addition, by predicting nodes from the pre-predicted frames, the encoding time required in the tree generation process may be reduced.

The processes of the transmission and reception devices according to the above-described embodiments may be described in combination with the following point cloud compression processing. In addition, operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same.

Executable instructions for performing the method/operations of the device according to the embodiments may be stored in a non-transitory CRM or other computer program products configured to be executed by one or more processors, or may be stored in a transitory CRM or other computer program products configured to be executed by one or more processors.

In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related contents have been described in the best mode for carrying out the embodiments.

As described above, the embodiments may be fully or partially applied to the point cloud data transmission/reception device and system. It will be apparent to those skilled in the art that variously changes or modifications can be made to the embodiments within the scope of the embodiments. Thus, it is intended that the embodiments cover the modifications and variations of this disclosure provided they come within the scope of the appended claims and their equivalents.

What is claimed is:

1. A method comprising:

generating information indicating that reference frames are used, wherein the reference frames are derived based on an encoding order;

encoding geometry data of point cloud data for a current point cloud frame by performing inter prediction based on a first reference point cloud frame and a second reference point cloud frame that are derived based on a hierarchical reference relationship;

generating information representing whether a reference frame is referenced bi-directionally;

generating a reference frame for the inter prediction based on the first reference point cloud frame and the second reference point cloud frame;

obtaining a predictive tree including predictive tree nodes, wherein slice geometry is represented by a sequence of one or more predictive trees of predictive tree nodes, and wherein the geometry data is predicted based on the reference frame and the predictive tree; and encoding attribute data of the point cloud data.

2. The method of claim 1, wherein:

the reference frames are before the current point cloud frame in order; or the reference frames are after the current point cloud frame in order; or one of the reference frames is before the current point cloud frame, and the other one of the reference frames is after the current point cloud frame.

3. The method of claim 2, wherein the predicting comprises:

searching for a third point belonging to one of the reference frames based on a previous point of the a point in the current point cloud frame.

4. The method of claim 3, wherein the predicting comprises:

selecting a plurality of candidate points in the reference frames based on a laser identifier and a radius of the previous point.

5. The method of claim 4, wherein the predicting comprises:

predicting the point based on one of the candidate points.

6. The method of claim 4, wherein the predicting comprises:

predicting the point based on at least two of the candidate points.

7. The method of claim 5, wherein the predicting comprises:

determining a first candidate point from a first reference frame;

determining a second candidate point from a second reference frame; and wherein the point is predicted based on the first candidate point and the second candidate point.

8. A device comprising:

a memory; and at least one processor connected to the memory, the at least one processor configured to:

generate information indicating that reference frames are used, wherein the reference frames are derived based on an encoding order;

encode geometry data of point cloud data for a current point cloud frame by performing inter prediction based on a first reference point cloud frame and a second reference point cloud frame that are derived based on a hierarchical reference relationship;

generate information representing whether a reference frame is referenced bi-directionally;

generate a reference frame for the inter prediction based on the first reference point cloud frame and the second reference point cloud frame;

obtain a predictive tree including predictive tree nodes, wherein slice geometry is represented by a sequence of one or more predictive trees of predictive tree nodes, and wherein the geometry data is predicted based on the reference frame and the predictive tree; and encode attribute data of the point cloud data.

9. A method comprising:

obtaining information indicating that reference frames are used, wherein the reference frames are derived based on a decoding order;

decoding geometry data of point cloud data for a current point cloud frame by performing inter prediction based on a first reference point cloud frame and a second reference point cloud frame that are derived based on a hierarchical reference relationship;

wherein one of the first reference point cloud frame and the second reference point cloud frame is obtaining information for representing whether the reference frame is referenced bi-directionally;

generating a reference frame for the inter prediction based on the first reference point cloud frame and the second reference point cloud frame;

obtaining a predictive tree including predictive tree nodes, wherein slice geometry is represented by a sequence of one or more predictive trees of predictive tree nodes, and wherein the geometry data is predicted based on the reference frame and the predictive tree; and decoding attribute data of the point cloud data.

10. The method of claim 9, wherein:

the reference frames are before the current point cloud frame in order; or the reference frames are after the current point cloud frame in order; or one of the reference frames is before the current point cloud frame, and the other one of the reference frames is after the current point cloud frame.

11. The method of claim 10, wherein the predicting comprises:

searching for a third point belonging to one of the reference frames based on a previous point of a point in the current point cloud frame.

12. The method of claim 11, wherein the predicting comprises:

selecting a plurality of candidate points in the reference frames based on a laser identifier and a radius of the previous point.

13. The method of claim 12, wherein the predicting comprises:

predicting the point based on one of the candidate points.

14. The method of claim 12, wherein the predicting comprises:

predicting the point based on at least two of the candidate points.

15. A device comprising:

a memory; and at least one processor connected to the memory, the at least one processor configured to:

obtain information indicating that reference frames are used, wherein the reference frames are derived based on a decoding order;

decode geometry data of point cloud data for a current point cloud frame by performing inter prediction based on a first reference point cloud frame and a second reference point cloud frame that are derived based on a hierarchical reference relationship;

obtain information representing whether a reference frame is referenced bi-directionally;

generate a reference frame for the inter prediction based on the first reference point cloud frame and the second reference point cloud frame;

obtain a predictive tree including predictive tree nodes, wherein slice geometry is represented by a sequence of one or more predictive trees of predictive tree nodes, and wherein the geometry data is predicted based on the reference frame and the predictive tree; and decode attribute data of the point cloud data.

16. A method of transmitting data for point cloud data, the method comprising:

obtaining a bitstream generated by:

generating information indicating that reference frames are used, wherein the reference frames are derived based on an encoding order;

encoding geometry data of point cloud data for a current point cloud frame by performing inter prediction based on a first reference point cloud frame and a second reference point cloud frame that are derived based on a hierarchical reference relationship;

generating information representing whether a reference frame is referenced bi-directionally;

generating a reference frame for the inter prediction based on the first reference point cloud frame and the second reference point cloud frame;

obtaining a predictive tree including predictive tree nodes, wherein slice geometry is represented by a sequence of one or more predictive trees of predictive tree nodes, and wherein the geometry data is predicted based on the reference frame and the predictive tree;

encoding attribute data of the point cloud data; and transmitting data for the point cloud data including the bitstream.

* * * * *